US011971570B2

(12) United States Patent
Fujita et al.

(10) Patent No.: US 11,971,570 B2
(45) Date of Patent: Apr. 30, 2024

(54) LIGHT DIFFUSER, LIGHTING DEVICE, AND METHOD OF MANUFACTURING LIGHT DIFFUSER

(71) Applicant: Mitsubishi Electric Corporation, Tokyo (JP)

(72) Inventors: Masashi Fujita, Tokyo (JP); Kazumasa Kawase, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 21 days.

(21) Appl. No.: 17/771,140

(22) PCT Filed: Nov. 19, 2019

(86) PCT No.: PCT/JP2019/045172
§ 371 (c)(1),
(2) Date: Apr. 22, 2022

(87) PCT Pub. No.: WO2021/100102
PCT Pub. Date: May 27, 2021

(65) Prior Publication Data
US 2022/0373163 A1   Nov. 24, 2022

(51) Int. Cl.
*F21V 8/00* (2006.01)
*F21S 8/00* (2006.01)
(Continued)

(52) U.S. Cl.
CPC .............. *G02B 6/0041* (2013.01); *F21V 9/02* (2013.01); *F21V 9/40* (2018.02); *G02B 6/0061* (2013.01);
(Continued)

(58) Field of Classification Search
CPC ........ F21V 9/40; G02B 6/0041; G02B 6/0076
See application file for complete search history.

(56) References Cited

U.S. PATENT DOCUMENTS 5,899,552 A      5/1999  Yokoyama et al.
10,215,906 B2 *  2/2019  Shi ........................ G02B 6/0041
                         (Continued)

FOREIGN PATENT DOCUMENTS

JP      6-324330 A      11/1994
JP      7-134298 A       5/1995
                         (Continued)

OTHER PUBLICATIONS

English Machine Translation of JP 2007273090 A (Year: 2007).*
(Continued)

*Primary Examiner* — Keith G. Delahoussaye
(74) *Attorney, Agent, or Firm* — XSENSUS LLP

(57) ABSTRACT

Provided are a light diffuser in which the brightness or hue in an emission surface of the light diffuser is controlled, a lighting device, and a method of manufacturing such a light diffuser.
A light diffuser (100) includes: an incident surface (121) to receive first light (Li); a light scattering portion (110) that includes light scattering particles (112) present in a medium (111) and generates scattered light by guiding the received first light and scattering the received first light with the light scattering particles; and an emission surface (122) to emit the scattered light, wherein a concentration of the light scattering particles in the light scattering portion is distributed such that the concentration increases non-linearly and continuously or discontinuously with distance from an incident edge in a light guiding direction of the first light in the light scattering portion.

17 Claims, 10 Drawing Sheets

(51) Int. Cl.
*F21V 9/02* (2018.01)
*F21V 9/40* (2018.01)
*F21Y 103/10* (2016.01)
*F21Y 115/10* (2016.01)

(52) U.S. Cl.
CPC .............. *G02B 6/0076* (2013.01); *F21S 8/00* (2013.01); *F21Y 2103/10* (2016.08); *F21Y 2115/10* (2016.08)

(56) References Cited

U.S. PATENT DOCUMENTS

| | | | |
|---|---|---|---|
| 11,465,375 B2* | 10/2022 | Williams | B29D 11/00355 |
| 2007/0086176 A1 | 4/2007 | Kanade et al. | |
| 2011/0182055 A1 | 7/2011 | Kanade et al. | |
| 2011/0194270 A1* | 8/2011 | Di Trapani | G02B 5/0242 362/147 |
| 2012/0051092 A1 | 3/2012 | Kanade et al. | |
| 2013/0114292 A1* | 5/2013 | Brick | G02B 6/0076 362/608 |
| 2017/0115445 A1* | 4/2017 | Wang | G02B 6/0065 |
| 2017/0184778 A1 | 6/2017 | Onda et al. | |
| 2018/0345630 A1 | 12/2018 | Di Trapani et al. | |
| 2021/0190279 A1 | 6/2021 | Fujii et al. | |

FOREIGN PATENT DOCUMENTS

| | | |
|---|---|---|
| JP | 7-161212 A | 6/1995 |
| JP | 2007-273090 A | 10/2007 |
| JP | 2011-515806 A | 5/2011 |
| JP | 2014-170703 A | 9/2014 |
| JP | 6440670 B2 | 12/2018 |
| JP | 2019-96622 A | 6/2019 |
| WO | 2013/012564 A2 | 1/2013 |
| WO | 2014/033686 A2 | 3/2014 |
| WO | 2019/220656 A1 | 11/2019 |
| WO | 2020/240664 A1 | 12/2020 |

OTHER PUBLICATIONS

English Machine Translation of ISA Written Opinion for PCT (Year: 2023).*

Extended European search report dated Nov. 2, 2022, in corresponding European patent Application No. 19953132.8, 9 pages.

International Search Report and Written Opinion dated Feb. 4, 2020, received for PCT Application PCT/JP2019/045172, Filed on Nov. 19, 2019, 9 pages including English Translation.

Notice of Reasons for Refusal dated Dec. 14, 2021, received for JP Application 2021-558062, 10 pages including English Translation.

* cited by examiner

LIGHT DIFFUSER, LIGHTING DEVICE, AND METHOD OF MANUFACTURING LIGHT DIFFUSER

CROSS-REFERENCE TO RELATED APPLICATION

The present application is based on PCT filing PCT/JP2019/045172, filed Nov. 19, 2019 the entire contents of which are incorporated herein by reference. This application is also related to U.S. application Ser. No. 17/054,175 filed on Nov. 10, 2020 (U.S. Patent Application Publication Number: 2021/0190279) and U.S. application Ser. No. 17/612,223 filed on Nov. 18, 2021 the entire contents of each of which are incorporated herein by reference.

TECHNICAL FIELD

The present invention relates to a light diffuser, a lighting device, and a method of manufacturing a light diffuser.

BACKGROUND ART

For the purpose of backlighting or lighting, there is known a technique of obtaining scattered light from incident light by using the scattering effect of light scattering particles. For example, Patent Literature 1 describes, as an example of a light guiding plate used for backlighting, a light guiding plate obtained by forming transparent material into a plate shape and dispersing therein light scattering particles capable of scattering light. The light guiding plate described in Patent Literature 1 emits light introduced into the light guiding plate from a light source facing an edge surface of the light guiding plate, through an emission surface.

To equalize the intensity of the light emitted from the light guiding plate over the entire emission surface of the light guiding plate, the light guiding plate is formed so that the number per unit area of the light scattering particles dispersed in the transparent material is greater in parts where the intensity of the light introduced from the light source is lower.

CITATION LIST

Patent Literature

Patent Literature 1: Japanese Patent Application Publication No. 2007-273090

SUMMARY OF INVENTION

Technical Problem

The light guiding plate is one embodiment of a light diffuser, and a light guiding system of a light diffuser in which light is introduced into the light diffuser from a light source facing an edge surface and light is emitted through an emission surface formed in a main surface, as described in Patent Literature 1, is referred to as an edge incidence system. Use of a light diffuser of the edge incidence system makes it possible to thin a display device or lighting device using the light diffuser.

However, Patent Literature 1 fails to disclose a specific example such as a specific preferable particle concentration distribution for a target brightness or product size (length and thickness).

For example, when the technique described in Patent Literature 1 is intended to be applied to a lighting device that simulates a blue sky by using Rayleigh scattering, it is difficult to obtain uniform brightness and hue by merely controlling the number per unit area of the light scattering particles in consideration of only the intensity of light introduced into the light diffuser.

Also, display devices or lighting devices are recently required to be increased in area. In the case of the edge incidence system, since a light guiding distance of light in the diffusing plate is increased, brightness unevenness or color unevenness is likely to become a problem.

Against the problems as described above, there is a demand for a guideline and an implementation technique that allow the brightness or hue in an emission surface of a light diffuser to be easily controlled.

Thus, the present invention is intended to provide a light diffuser in which the brightness or hue in an emission surface of the light diffuser is controlled, e.g., the brightness or hue in an emission surface of the light diffuser is improved in uniformity, a lighting device, and a method of manufacturing such a light diffuser.

Solution to Problem

An aspect of a light diffuser according to the present disclosure is a light diffuser to receive first light and emit scattered light, the light diffuser including: an incident surface to receive the first light; a light scattering portion including light scattering particles present in a medium, the light scattering portion generating the scattered light by guiding the received first light and scattering the received first light with the light scattering particles; and an emission surface to emit the scattered light, wherein a concentration of the light scattering particles in the light diffuser is distributed such that the concentration increases non-linearly and continuously or discontinuously with distance from an incident edge in a light guiding direction of the first light.

Also, an aspect of a light diffuser according to the present disclosure may be a light diffuser to receive first light and emit scattered light, the light diffuser including: an incident surface to receive the first light; a light scattering portion including light scattering particles present in a medium, the light scattering portion generating the scattered light by guiding the received first light and scattering the received first light with the light scattering particles; a light transmitting portion that does not include the light scattering particles in a medium; and an emission surface to emit the scattered light, wherein a light guiding portion to function as a light guiding path for the first light is formed by the light scattering portion and the light transmitting portion joined to the light scattering portion, and wherein the light scattering portion is a laminated structure of two or more diffusing films having different lengths in a light guiding direction of the first light or a structure in which a particle concentration in the medium is substantially uniform and that has a surface having a predetermined curved surface shape or step.

Also, an aspect of a lighting device according to the present disclosure includes a light source to emit first light, and the above-described light diffuser.

Also, an aspect of a method of manufacturing a light diffuser according to the present disclosure is a method of manufacturing a light diffuser including an incident surface to receive first light, a light scattering portion that includes light scattering particles present in a medium and generates scattered light by guiding the received first light and scattering the received first light with the light scattering particles, and an emission surface to emit the scattered light, the method including: a first step of dispersing the light scattering particles in material for the medium to form a pre-light scattering portion of predetermined shape; and a second step of joining a plurality of the pre-light scattering portions of predetermined shape formed in the first step to form the light scattering portion, wherein in the second step, the light scattering portion is formed by joining the plurality of the pre-light scattering portions that are different in at least one of concentration of the light scattering particles in the medium and length in a light guiding direction of the first light.

Advantageous Effects of Invention

According to the present disclosure, it is possible to provide a light diffuser in which the brightness or hue in an emission surface of the light diffuser is controlled, a lighting device, and a method of manufacturing such a light diffuser.

DESCRIPTION OF EMBODIMENTS

Embodiments will be described below with reference to the drawings. In each drawing described below, elements may be shown on different scales. Also, in each embodiment described below, to facilitate explanation, coordinate axes of an XYZ orthogonal coordinate system may be shown in drawings.

First Embodiment

Figure 1:
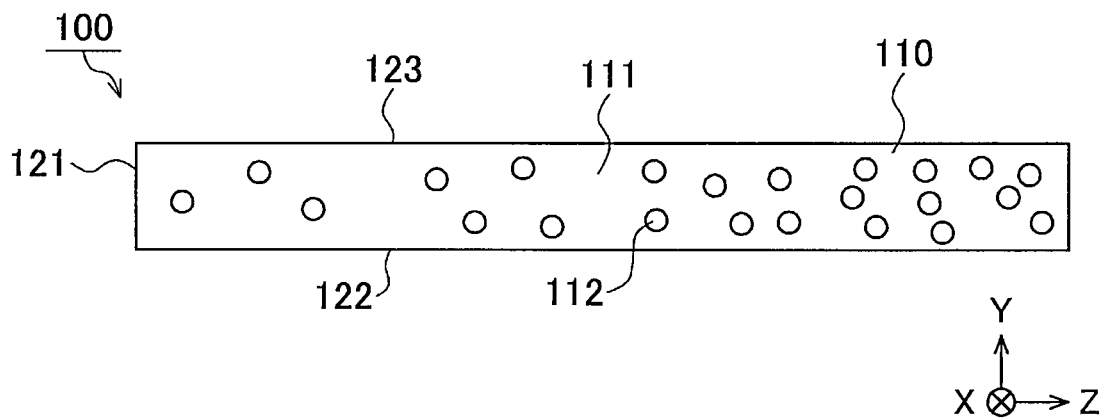
FIG. 1 is a cross-sectional view illustrating an example of a light diffuser 100 according to a first embodiment.

FIG. 1 is a cross-sectional view illustrating an example of a light diffuser 100 according to a first embodiment. The light diffuser 100 illustrated in FIG. 1 has a plate shape having a rectangular cross-section and has a substantially uniform cross-section in a longitudinal direction. The light diffuser 100 need not necessarily have a plate shape. The light diffuser 100 may have, for example, a rod shape. Here, the plate shape is a shape having two main surfaces connected by side surface(s). Also, the rod shape is a shape of a column body having two bases connected by one or more side surfaces. Rod is a general term for column bodies. Hereinafter, in the rod shape, regardless of the base shape, the side surface(s) connected to the two bases (in the case of a hollow column body, the outer surface(s) of the side(s)) will be referred to as main surface(s). Also, hereinafter, regardless of the shape of the light diffuser 100, an edge surface forming an edge portion of a main surface may be referred to as "a side surface of the light diffuser 100". Examples of the side surface of the light diffuser 100 include the side surface(s) of a plate shape and the bases of a rod shape.

In the case of a light diffuser having a plate shape or a rod shape, main surface(s) are mainly used as emission surface(s) for emitting scattered light to the outside. Hereinafter, in the case of a plate shape, when one of the main surfaces is used as an emission surface, the one of the main surfaces may be referred to as a first surface or front surface, and the other of the main surfaces may be referred to as a second surface or back surface. Also, in the case of a rod shape, when a partial region on the main surface(s) (side surface(s) of the column body) is used as an emission surface, the partial region may be referred to as a first surface or front surface, and a region (more specifically, a region on the main surface(s)) located opposite thereto may be referred to as a second surface or back surface. Also in the case of a plate shape, a partial region on the main surfaces can be used as an emission surface, and in this case, the first surface or front surface refers to the partial region, and the second surface or back surface refers to a region (more specifically, a region on the main surfaces) located opposite to the partial region.

The first surface and second surface are not limited to flat surfaces, and may be curved or inclined relative to the opposite surface. That is, the first surface and second surface may be curved surfaces, inclined surfaces, or a combination of a flat surface and one or both of a curved surface and an inclined surface. In the following embodiments, a normal direction of an emission surface is taken as an emission direction of scattered light of the light diffuser 100. When an emission surface includes a surface other than a flat surface, a normal direction of a central portion of the emission surface or a normal direction of a tangent plane of a central portion of the emission surface may be taken as an emission direction of scattered light of the light diffuser 100. Also, when an emission surface has different normal directions, such as when an emission surface is formed on the side surface of a cylinder, an arbitrary one of the different normal directions can be taken as an emission direction of scattered light of the light diffuser 100.

The light diffuser 100 is a structure including at least one incident surface 121 and at least one emission surface 122. Also, the light diffuser 100 includes a light scattering layer 110. The light scattering layer 110 is also referred to as a light scattering portion. Also, the light diffuser 100 may include a back surface 123. In the example illustrated in FIG. 1, the main surface on the −Y axis direction side is illustrated as the emission surface 122, and the main surface on the +Y axis direction side is illustrated as the back surface 123. However, for example, it is also possible to take the main surface on the +Y axis direction side in the drawing as the emission surface 122 and the main surface on the −Y axis direction side in the drawing as the back surface 123, or to take the main surfaces on the ±Y axis direction sides as the emission surface 122.

The light diffuser 100 receives light through the incident surface 121, scatters the received light while guiding the received light therein, and emits it through the emission surface 122.

The incident surface 121 receives, for example, light emitted by a light source. The incident surface 121 is formed, for example, at an edge portion of the light diffuser 100. The emission surface 122 emits, for example, scattered light generated in the light diffuser 100. Also, the emission surface 122 may emit light guided in the light diffuser 100. The emission surface 122 is formed, for example, in the surface of the light diffuser 100. The emission surface 122 may be formed, for example, in a partial region of the surface of the light diffuser 100.

The following describes an example of the light diffuser 100 of an edge incidence system that receives light through an edge surface on the −Z axis side of the main surfaces and emits scattered light in the −Y axis direction while guiding the received light in the +Z axis direction. The light guiding direction of the received light and the emission direction of the scattered light in the light diffuser 100 are not limited to this example.

Hereinafter, light incident on the light diffuser 100 may be referred to as light Li. Also, scattered light emitted from the light diffuser 100 may be referred to as light Ls or scattered light Ls. Also, light guided in the light diffuser 100 may be referred to as light Lt or transmitted light Lt. In the present specification, while light generated due to scattering is referred to as "scattered light", emitted scattered light is also referred to as diffused light. Also, "light guiding" refers to transmitting light entering a medium, along a predetermined optical path in the medium. Light Li is also referred to as first light. In this case, light Lt is first light received by the light diffuser 100 and corresponds to light guided in the light diffuser 100.

Figure 2A:
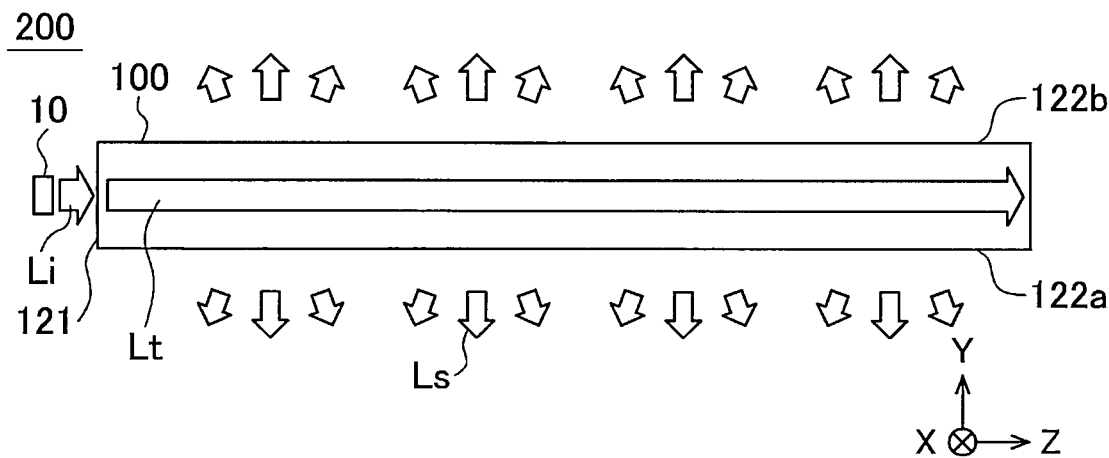
FIG. 2A is an explanatory diagram illustrating an example of light Li, light Ls, and light Lt.
Figure 2B:
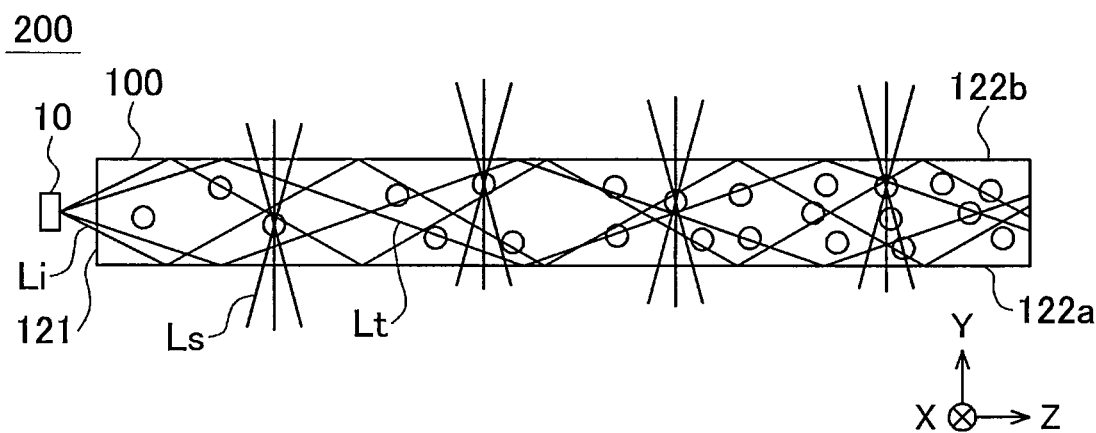
FIG. 2B is an explanatory diagram illustrating an example of the principle of occurrence of light Ls in the light diffuser 100.

FIG. 2A is an explanatory diagram illustrating an example of light Li, light Ls, and light Lt. Also, FIG. 2B is an explanatory diagram illustrating an example of the principle of occurrence of light Ls in the light diffuser 100. As illustrated in FIGS. 2A and 2B, the light diffuser 100 receives light Li emitted from at least one light source 10 through the incident surface 121 and emits scattered light Ls generated due to the scattering effect of the light scattering layer 110 through the emission surface 122 while guiding the received light Li as light Lt. Here, as illustrated in FIGS. 2A and 2B, the number of the at least one emission surface 122 that emits scattered light Ls is not limited to one. For example, scattered light Ls may be emitted through a surface 122a and a surface 122b behind the surface 122a. Hereinafter, a layer, such as the light scattering layer 110 of this embodiment, that functions as a light guiding path that guides the received light Li as light Lt in the light diffuser 100 may be referred to as a light guiding portion.

Also, light Lt may be light traveling inside the light diffuser 100 in the +Z axis direction from an incident edge (the incident surface 121) to an edge portion opposite thereto. Light Lt may be light that is guided while being repeatedly reflected at surfaces (in this example, the surfaces 122a and 122b) of the light diffuser 100, as illustrated in FIG. 2B. The reflection here may be, for example, total reflection. As illustrated in FIG. 2B, light Ls is generated by the received light Li being scattered by light scattering particles 112 or the like included in the light scattering layer 110 while being guided as light Lt, for example.

The light scattering layer 110 is a layer that exhibits a predetermined scattering power to light Lt. The light scattering layer 110 includes, for example, a base (medium) 111 and the light scattering particles 112. As long as the scattering power is capable of scattering light introduced to the inside, the details of the scattering power are not particularly limited. Also, the scattering power includes reflection and refraction. The light scattering layer 110 may be, for example, a layer in which spherical particles as the light scattering particles 112 are dispersed in the base 111.

The base 111 should be a material that transmits light. The base 111 is, for example, solid. The base 111 may be, for example, a thermoplastic resin, such as a polycarbonate resin, a polyarylate resin, a polyethylene terephthalate resin, a polyamide resin, a polystyrene resin, a polymethacrylic styrene resin, a polyacrylonitrile-styrene resin, a polymethyl methacrylate resin, a polymethyl pentene resin, a cyclic olefin resin, a polyphenylsulfone resin, a polysulfone resin, a polyethersulfone resin, a polyamide-imide resin, or a polyetherimide resin. Also, the base 111 may be, for example, a thermosetting resin, such as an epoxy resin, a polyurethane resin, a silicone resin, or a polyimide resin. Also, it may be a photopolymerizable resin, such as a urethane acrylate resin, an epoxy acrylate resin, an acrylic acrylate resin, a polyester acrylate resin, an alicyclic epoxy resin, or a glycidyl epoxy resin. The base 111 is not limited to a solid, and may be a liquid, a liquid crystal, or an ionic fluid.

The light scattering particles 112 may be any as long as they cause at least one of reflection and refraction of light, for example. The light scattering particles 112 may be inorganic particles that are inorganic oxide, such as zinc oxide, aluminum oxide, titanium oxide, zirconium oxide, silicon oxide, or cerium oxide. Also, the light scattering particles 112 may be organic particles of acrylic resin, polystyrene resin, melamine resin, polyamide resin, or the like. Also, the light scattering particles 112 may be inorganic-organic particles, such as silicone-acrylic composite particles.

Also, the light scattering layer 110 may be an organic-inorganic hybrid resin, such as a hybrid material of resin and inorganic oxide. In this case, the light scattering particles 112 may be inorganic oxide particles formed by sol-gel curing or the like with the base 111 as a base.

The light scattering particles 112 are, for example, spherical. The light scattering particles 112 are, for example, exactly spherical. Also, the light scattering particles 112 may be, for example, ellipsoidal. Also, the light scattering particles 112 may have a spherical shape with irregularities at a part thereof. Also, the light scattering particles 112 may be hollow. The light scattering particles 112 may be, for example, hollow spherical particles.

Also, the light scattering particles 112 may be nanoparticles having a size (primary particle size) on the order of nanometers (nm). In this case, it is possible to extract scattered light Ls that simulates a blue sky by using Rayleigh scattering due to the light scattering particles 112. Specifically, it is possible to extract scattered light Ls having a correlated color temperature higher than a correlated color temperature of light Li, which is incident light. While nanoparticles generally refer to particles having a size of one to hundreds of nanometers, the size of the light scattering particles 112 may be 1 to 990 nm. For the purpose of simulating a blue sky, the size of the light scattering particles 112 is preferably 30 to 500 nm, more preferably 50 to 350 nm, and still more preferably 60 to 150 nm.

Also, in the light diffuser 100, the light scattering particles 112 may be distributed such that the concentration thereof increases with increasing distance from the incident edge in the light guiding direction of light Lt. More specifically, the light scattering particles 112 are preferably distributed such that the concentration thereof increases continuously or discontinuously with distance from the incident edge. In this case, the increasing tendency in the particle concentration distribution is preferably non-linear instead of a simple increase. That is, the light scattering particles 112 are preferably distributed such that the concentration thereof increases non-linearly and continuously or discontinuously with distance from the incident edge. Here, the increasing tendency in the concentration distribution may be exponential or may be according to a fractional function as described below. Thus, the light scattering particles 112 may be distributed such that the concentration thereof in the light diffuser 100 increases continuously or discontinuously with distance from the incident edge, exponentially or according to a predetermined fractional function. Such a particle concentration distribution of the light diffuser 100 can improve the uniformity of brightness and hue in the emission surface.

Figure 3:
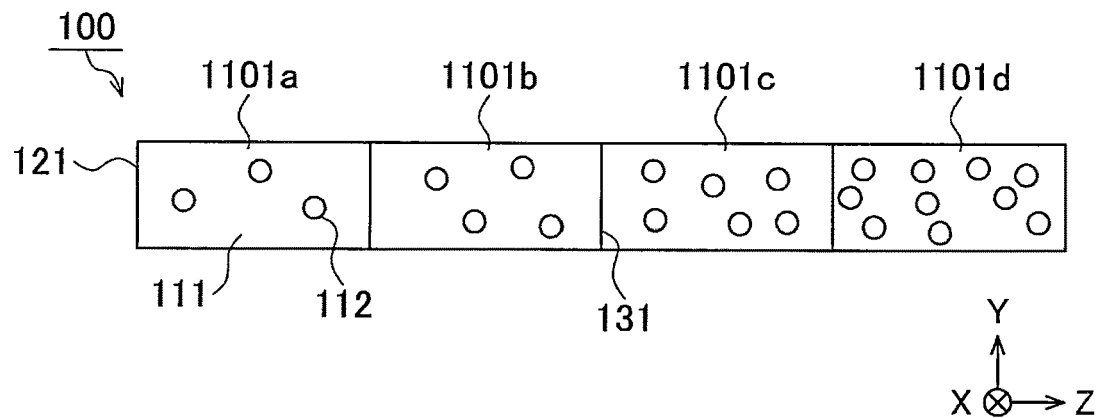
FIG. 3 is a cross-sectional view illustrating a configuration example of the light diffuser 100 according to the first embodiment.

As a method of easily implementing such a particle concentration distribution, for example, the light scattering layer 110 may be obtained by joining and integrating multiple light scattering layers 1101 (e.g., light scattering layers 1101a to 1101d) as illustrated in FIG. 3. In this case, a joint surface 131 may exist between a light scattering layer 1101 and another light scattering layer 1101. The way in which the joint surface 131 is formed is not particularly limited. The joint surface 131 may be formed by, for example, the light scattering layers 1101 being joined together by adhesive, thermal fusion bonding, or the like. The light scattering layers 1101 are also referred to as second light scattering portions, for example.

An example of the adhesive is a solvent adhesive (e.g., an adhesive manufactured by Acrysunday). In the case of using a solvent adhesive, although they are sufficiently joined by merely leaving them at room temperature for about one to two minutes, it is more preferable to leave them for 24 hours.

In this case, the light scattering particles 112 in each light scattering layer 1101 may be dispersed uniformly or non-uniformly. However, it is required that in a region including the joint surface 131 between the light scattering layers 1101, the uniformity of brightness be not impaired due to a large difference in the particle concentration.

When the light scattering layer 110 is constituted by multiple light scattering layers 1101 having different particle concentrations, the way of arranging them (the arrangement in the light guiding direction of light Lt) is not particularly limited. Thus, the number and arrangement of the light scattering layers 1101 can be freely determined depending on the intended brightness distribution or hue distribution. For the purpose of improving the uniformity of brightness and hue in the emission surface, it is preferable that the multiple light scattering layers 1101 be consecutively arranged such that the concentration n (particles/m$^3$) of the light scattering particles 112 in the light scattering layer 110 increases non-linearly and continuously or discontinuously with the distance x from the incident edge in the light guiding direction of light Lt, as described above. The non-linearity here may be exponential, or may be according to a predetermined fractional function, for example.

Here, the fractional function may be represented by the following formula (1):

$$n(x) = \frac{c}{-ax+b}. \tag{1}$$

In formula (1), n(x) denotes the concentration (particles/m$^3$) of the light scattering particles 112 in the light diffuser IOU at the distance x (m). Also, a, b, and c are constants as follows. They are constants represented by a=r, b=1, and c=2r/(q×p), where r is the ratio $S_0/I_0$ of a scattered light intensity $S_0$ and an incident light intensity $I_0$ at the incident edge, q is a cross-sectional area (m$^2$) of the light scattering particles 112 (more specifically, a projected cross-sectional area of the light scattering particles 112 as viewed in the light guiding direction of light Lt) (in the example of FIGS. 2A and 2B, an XY cross-sectional area of the light scattering particles 112), and p is a scattering probability by the light scattering particles 112. q×p is referred to as a scattering cross-section of the light scattering particles 112.

Also, symbol D in the drawing denotes a length of the light diffuser 100 (more specifically, a length of the light diffuser 100 in the light guiding direction of light Lt), and symbol H denotes a thickness of the light diffuser 100 (more specifically, a length of the light diffuser 100 in a direction perpendicular to the light guiding direction of light Lt) (in this example, a length of the diffuser 100 in a normal direction of the emission surface). Rewriting formula (1) with r, q, and p yields the following formula (2)

$$n(x) = \frac{2r/(q \times p)}{1-rx}. \tag{2}$$

Figure 4:
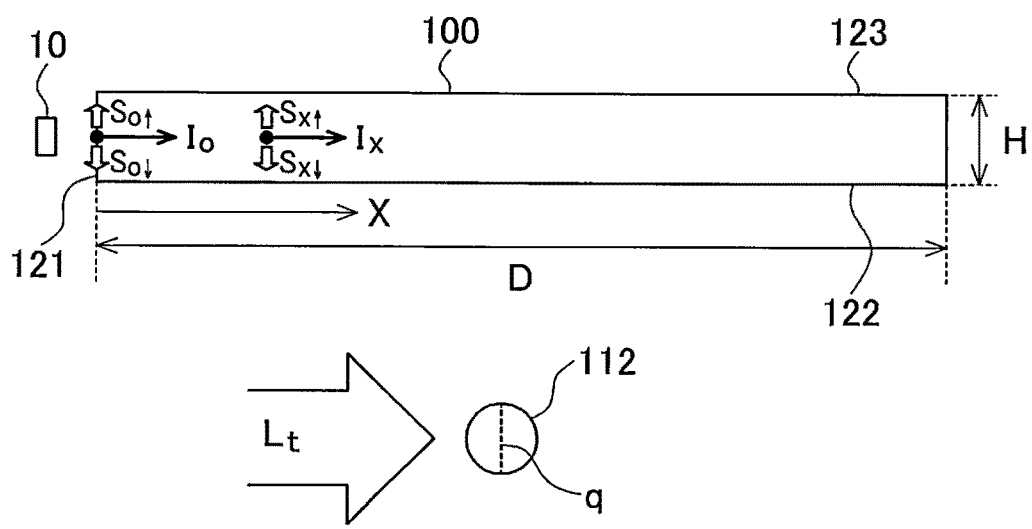
FIG. 4 is an explanatory diagram illustrating an example of a model of the light diffuser 100 used in derivation of a fractional function to which a concentration distribution of light scattering particles conforms.

FIG. 4 is a model diagram of the light diffuser 100 used in derivation of the above formulae. In the model illustrated in FIG. 4, the intensity S(x) of scattered light toward the lower side (−Y axis side in the drawing) of the light diffuser 100 is determined by the following formula (3):

$$S(x)=I(x)\times n(x)\times q\times p\times \tfrac{1}{2}, \tag{3}$$

Here, x (½) of the fifth term of the right side is intended to extract only the scattered light Ls directed downward of the scattered light Ls directed upward and downward. When the scattered light Ls directed upward is also extracted by using a reflective plate or the like, the fifth term may be omitted. In this case, for the above constant c, it should be replaced with c=r/(q×p).

The intensity I(x) of light (forward light) traveling in the light guiding direction decreases due to scattering while it is transmitted to the position at the distance x. The gradient of I(x) is proportional to the intensity of the forward light itself.

Under such an assumption, in order for S(x) to be constant at $S(x)=S_0$, the forward light I(x) should be scattered at a constant rate while traveling in the light guiding direction. That is, the following formula (4) should be satisfied:

$$I(x)=I_0-2S_0 x, \quad (4)$$

From formulae (3) and (4), the following formula (5) is derived, and formula (6) is further derived:

$$S_0 = (I_0 - 2S_0 x) \times n(x) \times q \times p \times \frac{1}{2}, \quad (5)$$

$$n(x) = \frac{2S_0/(q \times p)}{I_0 - S_0 x}. \quad (6)$$

Here, the above formula (2) is derived from formula (6) by using r $S_0/I_0$.

The above formula (1) is merely an example, and the concentration distribution of the light scattering particles 112 in the light diffuser 100 may be one that satisfies any of the following first to third conditions, for example. Hereinafter, for example, when the second or third condition is satisfied, the light diffuser 100 may be considered such that the concentration of the light scattering particles 112 is distributed to increase exponentially and continuously or discontinuously with the distance x. Also, when the third condition is satisfied, it may be considered that the concentration of the light scattering particles 112 in the light diffuser 100 is distributed to increase continuously or discontinuously according to the fractional function shown in formula (1).

(First Condition)

The concentration n of the light scattering particles 112 increases with increase in the distance x. That is, the light scattering layer 110 may satisfy the following formula (7). As described above, in addition, it preferably increases non-linearly.

$$0 < \frac{d}{dx} n(x) \quad (7)$$

(Second Condition)

The gradient of n(x) increases with increase in x. That is, the light scattering layer 110 may satisfy the following formula (8):

$$0 < \frac{d^2}{dx^2} n(x). \quad (8)$$

(Third Condition)

The gradient of n(x) is within a predetermined range. That is, the light scattering layer 110 may satisfy the following formula (9):

$$0 < \frac{d^2}{dx^2} n(x) < \frac{2r/(q \times p)}{1 - rx} \times \alpha. \quad (9)$$

Here, α is a parameter indicating an acceptable range from the fractional function shown in formula (1) with respect to the gradient of n(x). Here, a is preferably a positive value not greater than 2. α may be a constant from 0.5 to 1.5. When the third condition is satisfied, the concentration distribution n(x) may be considered to satisfy the fractional function shown in formula (1).

In the above example, the fact that the concentration of light scattering particles 112 in a medium is distributed to increase continuously or discontinuously with the distance x means that the concentration of the light scattering particles 112 in the light diffuser 100 per unit volume increases continuously or discontinuously with the distance x. Here, although the unit of length of the unit volume can be arbitrarily set, it may be on the order of millimeters, for example. Also, the volume corresponding to a unit weight (e.g., 1 g) may be taken as the unit volume. Since the above concentration distribution of the light scattering particles 112 in the light diffuser 100 mainly refers to an in-plane distribution of the particle concentration as viewed from an emission surface side, the thickness H (the length in a thickness direction) of the light diffuser 100 (or light guiding portion) may be taken as the length in the thickness direction of the unit volume.

For example, in the case of the example illustrated in FIG. 3, the concentration of the light scattering particles 112 per unit volume decreases in the order of the light scattering layers 1101d, 1101c, 1101b, and 1101a. That is, the light scattering layer 1101a has the lowest particle concentration, the light scattering layer 1101b has a higher particle concentration than the light scattering layer 1101a, the light scattering layer 1101c has a higher particle concentration than the light scattering layer 1101b, and the light scattering layer 1101d has the highest particle concentration. That is, the multiple light scattering layers 1101 constituting the light scattering layer 110 are arranged such that the particle concentration increases gradually (or in steps) in the light guiding direction of light Lt.

Examples of the method of measuring the particle concentration or its distribution in the light diffuser 100 or a certain medium include the following. As the first example, when the light scattering particles 112 are inorganic particles, it is possible to quantitatively measure the percentage (mass %) of an element (e.g., Si in the case of silica particles) contained in the composition of the light scattering particles 112 in a sample by using inorganic element analysis, and determine the number or concentration of the light scattering particles 112 in the sample on the basis of the percentage. Examples of the inorganic element analysis include ICP-atomic emission spectroscopy (ICP-AES) and ICP-optical emission spectrometry (ICP-OES) using inductively coupled plasma (ICP). In determining the number or concentration of the light scattering particles 112 in the sample, it is possible to use the bonding state of elements in the sample determined by another analytical method or the shape and/or size of the particles in the sample. The bonding state of elements in the sample can be analyzed by using, for example, X-ray photoelectron spectroscopy (XPS) or high energy resolution Auger electron spectroscopy (AES). The shape and/or size of the particles in the sample can be analyzed by using, for example, a scanning electron microscope (SEM) or a transmission electron microscope (TEM).

As the second example, it is possible to cause light having a high straight traveling property, such as laser light, to enter the light diffuser 100 in the thickness direction, perform an intensity measurement to measure a light intensity of straight transmitted light emitted from the light diffuser 100, at each of multiple positions in a surface as viewed from an emission surface side of the light diffuser 100, and estimate the particle concentration or its distribution in the light diffuser 100 on the basis of the light intensity distribution of the straight transmitted light obtained from the intensity measurements. The light intensity of straight transmitted light emitted from the light diffuser 100 depends on the scattering probability of the light diffuser 100 at the position. Here, the scattering probability of the light diffuser 100 is a parameter having a predetermined correlation with the concentration (the number per unit volume) of the light diffusing particles 112. Thus, by using such a correlation, the distribution of the light intensity of the straight transmitted light in the surface obtained from the measurements can be converted to the particle concentration or particle distribution in the surface. An example of the above correlation is linear (a linear function), but the correlation is not limited to this depending on the used materials or design concept (desired brightness or hue).

It is preferable that the particle concentration distribution in in-plane directions perpendicular to the light guiding direction be uniform. However, this is not mandatory in that a slight unevenness in the distribution may occur in manufacturing.

Also, the above example of the concentration distribution of the light scattering particles 112 is a preferable example when light enters only through one edge surface of the light diffuser 100. Thus, this does not apply when light is caused to enter through multiple edge surfaces (e.g., two opposite side surfaces, three or more side surfaces including adjacent side surfaces, or the like). In such cases, since there are two or more light guiding directions of light Lt in the light diffuser 100, it is possible, for example, to apply the above example of concentration distribution of the light scattering particles 112 to each of the light guiding directions of light through the respective incident edges and set, as a final concentration distribution, a result obtained by superposing an in-plane distribution or its gradient as viewed from a side of the emission surface of them. Thereby, it is possible to set the concentration of the light scattering particles 112 to be a distribution appropriate with respect to the distances x from all the incident edges in all the light guiding directions of light Lt. As an example, when light enters through two opposite end portions, the concentration of the light scattering particles 112 is preferably distributed such that it is highest near a central portion and decreases toward the incident surfaces.

Also, the above example of the concentration distribution of the light scattering particles 112 is a preferable example for equalizing the intensity of scattered light Ls emitted from the emission surface 122 in the surface. Thus, this does not apply for purposes other than improving uniformity. Thus, the light diffuser 100 may have an arbitrary concentration distribution.

Also, although the above has described some preferable examples of the concentration distribution of the light scattering particles 112 in the light diffuser 100 (more specifically, the light scattering layer 110 as the light guiding portion), the above concentration distribution or its increasing tendency may be simply considered as the in-plane distribution or its increasing tendency of the ratio by weight or mass of a predetermined element constituting the light scattering particles 112 in a unit volume (the percent by weight or mass of the element per unit volume) in the light diffuser 100 (more specifically, the light scattering layer 110) as viewed from an emission surface side.

Also, the light diffuser 100 is formed by the light scattering layer 110, for example. Also, the light diffuser 100 may have a configuration in which multiple light scattering layers 1101 are arranged along the light guiding direction of light Lt, for example. When there are multiple light guiding directions of light Lt, it is preferable that they be arranged along the directions. Also, the light diffuser 100 may include an antireflection layer, an antifouling layer, a heat shielding layer, or other functional layers, in addition to the single light scattering layer 110 or multiple light scattering layers 1101. Also, the light diffuser 100 may include a light transmitting layer that exhibits no scattering power. The light transmitting layer is also referred to as a light transmitting portion. The light transmitting layer may be, for example, a transparent substrate. In this case, the light scattering layer 110 may be formed on the transparent substrate. Also, a the light transmitting layer may be a light transmitting layer 113 to be described later.

Also, the light diffuser 100 and light scattering layer 110 may arbitrarily contain a reinforcement or an additive as long as their optical characteristics are not significantly impaired.

Examples of the reinforcement include fibrous reinforcement and plate-shaped reinforcement pieces. Specific examples of the fibrous reinforcement include carbon fiber, glass fiber, boron fiber, asbestos fiber, polyvinyl alcohol fiber, polyester fiber, acrylic fiber, wholly aromatic polyamide fiber, polybenzoxazole fiber, polytetrafluoroethylene fiber, kenaf fiber, bamboo fiber, hemp fiber, bagasse fiber, high strength polyethylene fiber, alumina fiber, silicon carbide fiber, potassium titanate fiber, brass fiber, stainless steel fiber, steel fiber, ceramic fiber, basalt fiber, sepiolite, and palygorskite. Two or more types of fibrous reinforcements may be used together. Also, the fibrous reinforcement may be subjected to surface treatment with a silane coupling agent. The fibrous reinforcement is preferably circular in cross-section, but may have a rectangular shape, an elliptical shape (flattened shape), or another irregular shape in cross-section as needed.

Specific examples of the plate-shaped reinforcement pieces include talc, mica, sericite, glass flakes, plate-shaped calcium carbonate pieces, plate-shaped aluminum hydroxide pieces, graphite, kaolin, and swellable layer silicate. Two or more types of plate-shaped reinforcement pieces may be used together. Adding plate-shaped reinforcement pieces can improve the dimensional stability.

Also, examples of the additive include impact resistance improvers, antistatic agents, conductivity imparting agents, thermally conductive fillers, other resin components, thermal stabilizers, light stabilizers, sliding property improvers, flame retardants, flame retardant aids, pigments, and light absorbers. Two or more types of additives may be used together.

Specific examples of the impact resistance improvers include olefin polymers, such as (ethylene and/or propylene)/α-olefin copolymers and (ethylene and/or propylene)/(α, β-unsaturated carboxylic acid and/or unsaturated carboxylic acid and/or unsaturated carboxylic ester) copolymers, and elastomers, such as styrene elastomers. Adding an impact resistance improver can improve the impact resistance or weld strength.

Specific examples of the antistatic agents include anionic antistatic agents, cationic antistatic agents, and non-ionic antistatic agents. Specific examples of the conductivity imparting agents include carbon blacks, carbon fibers, and metallic fibers. Adding an antistatic agent or a conductivity imparting agent can reduce the surface resistivity or volume resistivity.

Specific examples of the thermally conductive fillers include talc, aluminum oxide, magnesium oxide, zinc oxide, magnesium carbonate, silicon carbide, aluminum nitride, boron nitride, silicon nitride, carbon, and graphite. Adding a thermally conductive filler can improve the thermal conductivity.

Specific examples of the other resin components include polyarylate resins, polycarbonate resins, polystyrene resins, acrylonitrile-styrene resins, acrylic resins, polyimide resins, polyetherimide resins, polyurea resins, epoxy resins, polyester resins, polyester imide resins, polyurethane resins, polyphenyl sulfones, polysulfones, polyethylenes, polypropylenes, polyvinyl chlorides, melamine resins, and silicone resins. Adding another resin component can improve the heat resistance, strength, flexibility, or the like.

Specific examples of the thermal stabilizers include hindered phenol compounds, phosphite compounds, hindered amine compounds, triazine compounds, and sulfur compounds. Adding a thermal stabilizer can reduce the reduction in molecular weight or the degradation in color of the base 111.

Specific examples of the light stabilizers include benzophenone compounds, benzotriazole compounds, salicylate compounds, hindered amine compounds, and hindered phenol compounds. Adding a light stabilizer can reduce the reduction in molecular weight of the base 111 due to ultraviolet light or the like.

Specific examples of the sliding property improvers include fluorine resins, such as polytetrafluoroethylene, and silicones, such as polydimethylsiloxane and fluorine-modified polydimethylsiloxane.

Examples of the flame retardants include bromine-containing flame retardants, nitrogen-containing flame retardants, phosphorus-containing flame retardants, nitrogen-phosphorus-containing flame retardants, hydrated metal flame retardants, and inorganic flame retardants.

Specific examples of the bromine-containing flame retardants include brominated polystyrene, polybrominated styrene, and brominated polyphenylene ether. Among them, because of being highly effective in improving the flame resistance, retardants containing 40 to 80% by mass of bromine are preferable, and retardants containing 50 to 70% by mass of bromine are more preferable. These bromine-containing flame retardants are preferably used together with flame retardant aids, such as antimony trioxide, antimony tetroxide, antimony pentoxide, sodium antimonate, tin (IV) oxide, iron (III) oxide, zinc oxide, or zinc borate.

Specific examples of the nitrogen-containing flame retardants include melamine compounds, salts of melamine compounds with cyanuric acid or isocyanuric acid, and salts of ammonia or melamine compounds with phosphoric acid or polyphosphoric acids.

Specific examples of the phosphorus-containing flame retardants include phosphate ester compounds, phosphinates, and diphosphinates.

Specific examples of the nitrogen-phosphorus-containing flame retardants include adducts (melamine adducts) formed from melamine or condensation products thereof and phosphoric acids. Specific examples of the phosphoric acids forming the melamine adducts include orthophosphoric acid, phosphonic acid, phosphinic acid, metaphosphoric acid, pyrophosphoric acid, triphosphoric acid, and tetraphosphate.

Specific examples of the hydrated metal flame retardants include aluminum hydroxide, boehmite, magnesium hydroxide, calcium hydroxide, and calcium aluminate.

Specific examples of the inorganic flame retardants include zinc borate, and mixtures of zinc borate and other zinc salts.

Also, specific examples of the pigments include titanium oxide, zinc oxide, zinc sulfide, zinc sulfate, barium sulfate, calcium carbonate, and alumina oxide.

Specific examples of the light absorbers include visible light absorbers and ultraviolet light absorbers. Adding a light absorber can adjust the hue of scattered light Ls. For example, among visible light absorbers, by using a red absorber, it is possible to emphasize a blue component of the scattered light in applications for simulating a blue sky. Specific examples of the red absorber include a visible light absorbing material FDB-001 (manufactured by Yamada Chemical Co., Ltd.).

Also, a transmissive functional coating, such as an anti-reflection coating, an antifouling coating, a heat shielding coating, or a scratch resistant coating, may be applied to at least one of the surfaces of the light diffuser 100.

Figure 5:
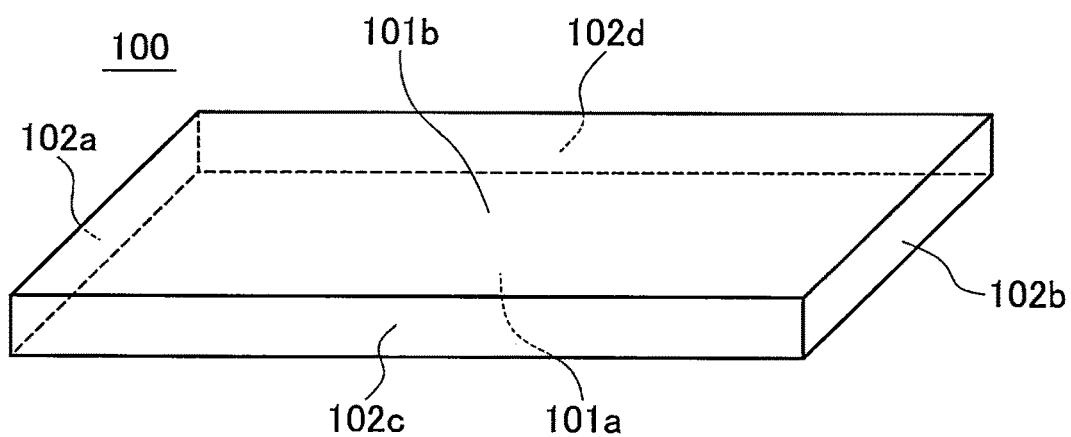
FIG. 5 is a perspective view illustrating an example of a shape of the light diffuser 100.

FIG. 5 is a perspective view illustrating an example of a shape of the light diffuser 100. When the light diffuser 100 has a plate shape as illustrated in FIG. 5, four surfaces other than main surfaces 101a and 101b are side surfaces 102a, 102b, 102c, and 102d. The main surfaces 101a and 101b are opposite to each other. Also, the side surfaces 102a and 102b are opposite to each other. Also, the side surfaces 102c and 102d are opposite to each other.

It is preferable that the surfaces (in particular the main surfaces) of the light diffuser 100 have high smoothness. However, this does not apply when fine scratches or fine irregularities occur in manufacturing. Also, this does not apply when the surfaces are intentionally roughened or provided with fine irregularities for the purpose of diffusing light emitted from the light diffuser 100 or other purposes.

The light diffuser 100 according to this embodiment can be used as a component of a lighting device, for example. FIGS. 2A and 2B described above are cross-sectional views when the light diffuser 100 is used in a lighting deice 200. The lighting device 200 includes the light source 10 that emits light Li, and the light diffuser 100 that receives light Li and emits scattered light Ls. Also, the lighting device 200 may include a frame (not illustrated) that supports the light source 10 and light diffuser 100.

Figure 6A:
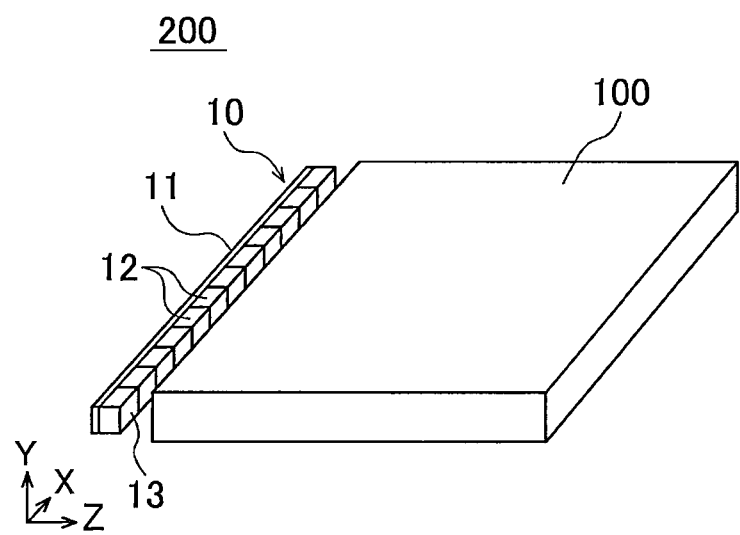
FIG. 6A is an explanatory diagram illustrating an example of an arrangement of a light source 10 relative to the light diffuser 100.
Figure 6B:
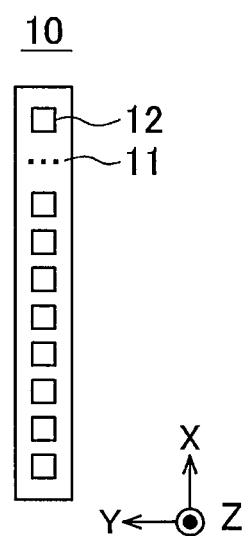
FIG. 6B is a schematic configuration diagram of the light source 10.

The light source 10 emits light Li. The light source 10 may be a light source that emits white light as light Li. The light source 10 is, for example, an LED light source. FIG. 6A is an explanatory diagram illustrating an example of an arrangement of the light source 10 relative to the light diffuser 100, and FIG. 6B is a schematic configuration diagram of the light source 10. As illustrated in FIGS. 6A and 6B, the light source 10 may include a substrate 11 and multiple light emitting elements 12 (e.g., LED elements) arranged on the substrate 11.

The light emitting elements 12 may emit light of the same color or different colors. The color of the light emitted by each light emitting element 12 may be one of red, green, and blue. Light emitting elements 12 of three colors of red, green, and blue may be provided in the light source 10 as a whole.

Also, the color of the light emitted by each light emitting element 12 may be one of white, green, and blue. Light emitting elements 12 of three colors of white, green, and blue may be provided in the light source 10 as a whole. Also, the color of the light emitted by each light emitting element 12 may be one of white, green, blue, and orange. Light emitting elements 12 of four colors of white, green, blue, and orange may be provided in the light source 10 as a whole.

The light source 10 includes at least one light emitting surface 13 that emits light. The light emitting surface 13 is disposed to face the incident surface 121 formed in an edge surface forming an edge portion of the main surfaces of the light diffuser 100, for example. Here, the edge surface forming the edge portion of the main surfaces of the light diffuser 100 includes a side surface of a plate shape and a base of a rod shape. For example, the light emitting surface 13 may be disposed along the incident surface 121. Also, for example, multiple light emitting surfaces 13 may be arranged in the thickness direction (the Y axis direction in the drawings) of the light diffuser 100 while being disposed along the incident surface 121.

For example, the at least one light emitting surface 13 is disposed to face at least one side surface (e.g., one or more side surfaces of the side surfaces 102*a* to 102*d* in FIG. 5) of the light diffuser 100 of plate shape. In this case, for example, as illustrated in FIG. 6A, the light source 10 (more specifically, the light emitting elements 12 constituting the light source 10) may be disposed along a side surface of the light diffuser 100 of plate shape. In the case of the example of FIG. 5, the light source 10 may be disposed along the side surface 102*a* of the light diffuser, for example. Also, the light source 10 may be disposed along the side surfaces 102*a* and 102*b* of the light diffuser, for example. Also, the light source 10 may be disposed along the side surfaces 102*a*, 102*b*, and 102*c* of the light diffuser, for example. Also, the light source 10 may be disposed along the side surfaces 102*a*, 102*b*, 102*c*, and 102*d* of the light diffuser, for example.

Also, the light source 10 may be disposed along at least one of the side surfaces 102*a*, 102*b*, 102*c*, and 102*d* of the light diffuser, for example. Also, multiple light sources 10 may be disposed along at least one of the side surfaces 102*a*, 102*b*, 102*c*, and 102*d* of the light diffuser, for example.

Next, a method of manufacturing the light diffuser 100 according to this embodiment will be described. FIGS. 7A to 7D are explanatory diagrams illustrating an example of the method of manufacturing the light diffuser 100 according to this embodiment. The example illustrated in FIGS. 7A to 7D is a method of manufacturing the light diffuser 100 having a desired particle concentration distribution by joining and integrating multiple resin formed bodies that form the multiple light scattering layers 1101 having different particle concentrations as illustrated in FIG. 3.

Figure 7A:
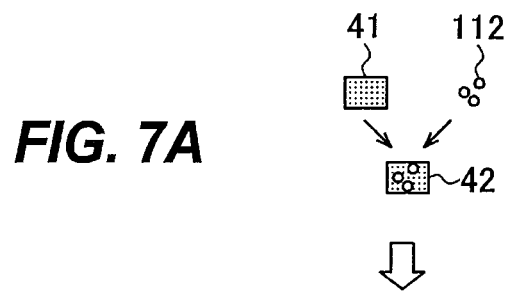
FIGS. 7A to 7D are explanatory diagrams illustrating an example of a method of manufacturing the light diffuser 100 according to the first embodiment.

In this example, a resin material (such as resin pellets) in which the light scattering particles 112 are dispersed in material that is the same as the base 111 of each light scattering layer 1101 is first prepared (FIG. 7A: a particle dispersion step). Here, it is preferable that the material for the base 111 of each light scattering layer 1101 be the same as those for the bases 111 of the other light scattering layers 1101, or be substantially the same as those for the bases 111 of the other light scattering layers 1101 in refractive index in the wavelength range of light Lt after the formation.

Known methods can be used for this step. For example, a material 42 (referred to below as a particle-containing material 42) with the light scattering particles 112 dispersed therein is prepared with a twin screw extruder by rotating the screws to extrude resin (molten resin) obtained by heating thermoplastic resin used as a material 41 for the base 111 of each light scattering layer 1101 to a temperature not lower than the melting point to place it in a molten state and adding the light scattering particles 112 thereto at a predetermined concentration. In this step, resin pellets may be obtained by causing molten resin with the light scattering particles 112 added thereto at a concentration higher than a desired particle concentration to be discharged through a die, drawing it in strand form, and cutting it with a cutting apparatus called a pelletizer.

Figure 7B:
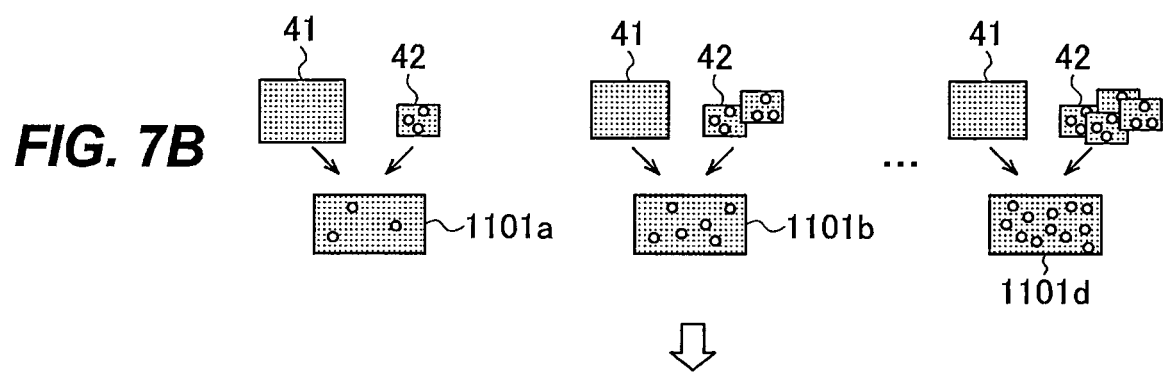

Then, multiple resin formed bodies designed to achieve target concentrations are prepared (FIG. 7B: a scattering layer formation step). Known methods can be used for this step. For example, a resin formed body of desired shape in which the light scattering particles 112 are dispersed in the base 111 at a target concentration is prepared with a single screw extruder by extruding thermoplastic resin used as the material 41 of the base 111 and the particle-containing material 42 (resin pellets) prepared in the particle dispersion step while melting and mixing them at a predetermined ratio. For example, in drawing the molten resin from the extruder, by using a T-die method to draw the molten resin discharged through a discharge outlet of a T-die, it is possible to prepare a plate-shaped resin formed body having an arbitrary thickness in which the light scattering particles 112 are dispersed in the base 111 at the target concentration. The T-die method is a method in which molten resin is processed into a plate shape by being extended through a narrow linear slit (flat die) when being extruded.

The particle dispersion step is not necessarily required, and for example, the particle dispersion step can be performed simultaneously in the scattering layer formation step. In this case, for example, the light scattering particles 112 may be fed instead of the resin material with the light scattering particles dispersed therein that is one of the materials fed to the single screw extruder. For example, a resin formed body of desired shape in which the light scattering particles 112 are dispersed in the base 111 at the target concentration may be prepared by using a single screw extruder to extrude the light scattering particles 112 and thermoplastic resin used as the material for the base 111 while melting and mixing them at a predetermined ratio.

The scattering layer formation step is performed a number of times equal to the number of the light scattering layers 1101 constituting the light scattering layer 110. At this time, the target concentration in each scattering layer formation step may be set to the target concentration of the corresponding light scattering layer 1101. By changing the mixing ratio of the material for the base 111 and the light scattering particles, it is possible to prepare resin formed bodies that form the light scattering layers 1101 (e.g., the light scattering layers 1101*a* to 1101*d* as illustrated in FIG. 3) having different particle concentrations. The resin formed bodies prepared in the above scattering layer formation step are also referred to as pre-light scattering portions.

Figure 7C:
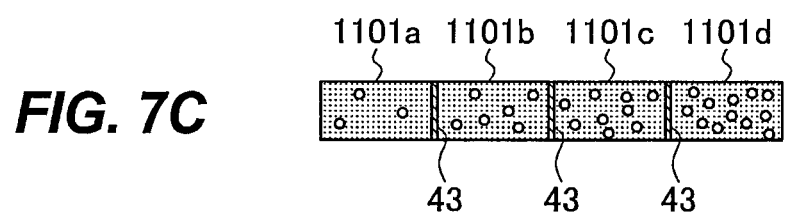

Then, the multiple resin formed bodies (light scattering layers 1101) having the different particle concentrations thus prepared are joined and integrated (FIG. 7C: a joining step). Known methods can be used for this step. For example, the multiple resin formed bodies prepared in the scattering layer formation step are joined and integrated by means of adhesive so that they are arranged in an order such that the particle concentration increases away from the incident edge. At this time, the light scattering layers 1101 may be arranged so that the distribution is such that the changes in the particle concentration between the multiple light scattering layers 1101 increase non-linearly with distance from the incident edge in the light guiding direction of light Lt. As a way of joining, for example, they may be joined by bonding surfaces to be joined together by means of adhesive 43. Alternatively, they may be joined by heating and melting surfaces to be joined together, causing the surfaces to closely adhere to each other, and then cooling them. In the joining step, although they are preferably joined by using one of these two methods, methods other than these may be used.

Figure 7D:
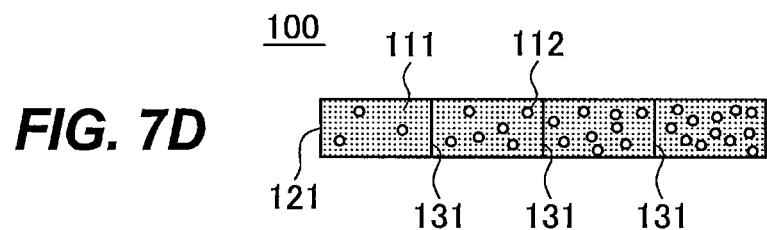

Thereby, it is possible to form the light scattering layer 110 as a joined body of the multiple resin formed bodies and the light diffuser 100 formed by such a light scattering layer 110 (see FIG. 7D). FIG. 7D illustrates the joint surfaces 131 between the light scattering layers 1101, but when they are melted and joined, it is possible that the joint surfaces 131 are not clearly present.

Also, when the light diffuser 100 includes a functional layer in addition to the light scattering layer 110, the other functional layer may be laminated to the light scattering layer 110 formed by the joining step of FIG. 7C, for example.

Also, in the above example, the multiple resin formed bodies are joined in an order such that the particle concentration increases away from the incident edge, but the order of arrangement of the resin formed bodies is not limited to this. The order of arrangement of the resin formed bodies is not particularly limited as long as it is in accordance with a target particle concentration distribution. For example, the resin formed bodies may be arranged so that the concentration of the light scattering particles 112 is highest near a central portion and decreases toward the incident edge in the light diffuser 100 as described above.

Figure 8A:
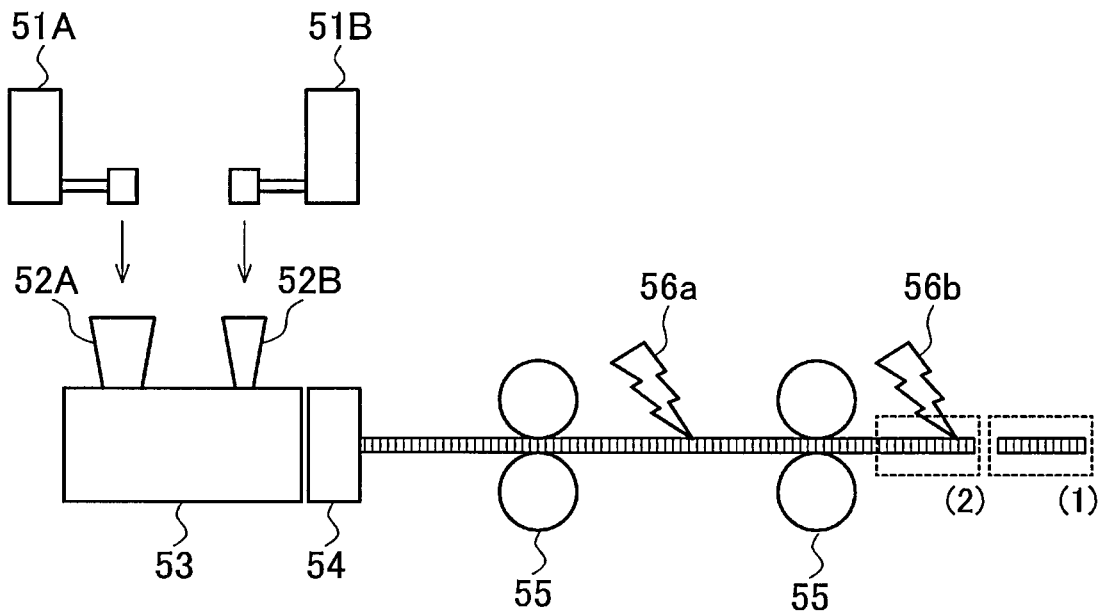
FIGS. 8A to 8C are explanatory diagrams illustrating another example of the method of manufacturing the light diffuser 100 according to the first embodiment.
Figure 8B:
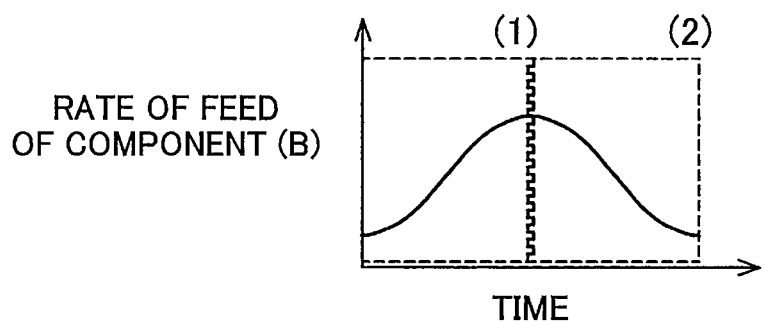
Figure 8C:
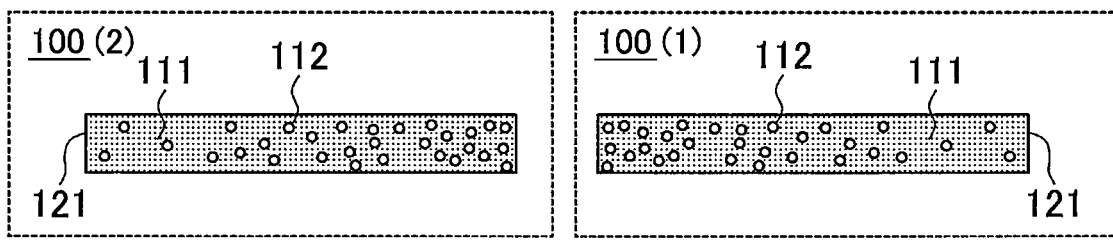

Also, FIGS. 8A to 8C are explanatory diagrams illustrating another example of the method of manufacturing the light diffuser 100 according to this embodiment. The example illustrated in FIGS. 8A to 8C is a method of manufacturing a light diffuser 100 having a single light scattering layer 110 in which the particle concentration varies continuously.

In the method illustrated in FIGS. 8A to 8C, a particle dispersion step is performed in a scattering layer formation step, and the concentration of the light scattering particles 112 added to material for the base 111 of the light scattering layer 110 is varied with time.

In such a scattering layer formation step, for example, molten resin obtained by melting thermoplastic resin that forms the base 111 of the light scattering layer 110 is fed to an extruder 53, such as a single screw extruder, by means of a resin material feeder 51A, and light scattering particles 112 are fed to the extruder 53 by means of a gravimetric powder feeder 51B. At this time, the gravimetric powder feeder 51B varies the rate of feed of the light scattering particles 112 with time. In this manner, by performing the extrusion while varying the rate of feed of the light scattering particles 112 to the extruder 53 with time, it is possible to prepare a resin formed body of arbitrary shape in which the added particle concentration in the base 111 varies along an extrusion direction. For example, by drawing the molten resin extruded from the extruder 53 by means of a T-die 54 and a drawing roll 55, it is possible to prepare a resin formed body of plate shape having an arbitrary thickness in which the added particle concentration in the base 111 varies along the extrusion direction.

As illustrated in FIG. 8A, it is also possible to form the light scattering layers 110 that form multiple light diffusers 100 in the same scattering layer formation step. In this case, sections having a desired concentration distribution may be cut out of the prepared resin formed body by means of cutters 56a and 56b or the like. In FIG. 8A, the cutter 56a represents a cutter that cuts the resin formed body in a direction parallel to the drawing sheet surface, and the cutter 56b represents a cutter that cuts the resin formed body in a direction perpendicular to the drawing sheet surface.

FIG. 8B is an explanatory diagram illustrating an example of the variation in the rate of feed of the light scattering particles 112 (referred to as component (B) in the drawing). For example, in the scattering layer formation step of this embodiment, by cutting off the section (e.g., the section enclosed by dashed line (1) in FIG. 8A) of the resin formed body formed by using the light scattering particles 112 fed during the time period enclosed by dashed line (1) in FIG. 8B, it is possible to cut off light diffuser 100(1) in FIG. 8C. Similarly, by cutting off the section (e.g., the section enclosed by dashed line (2) in FIG. 8A) of the resin formed body formed by using the light scattering particles 112 fed during the time period enclosed by dashed line (2) in FIG. 8B, it is possible to cut off light diffuser 100(2) in FIG. 8C. The light diffusers 100(1) and 100(2) can be said to be light diffusers 100 having the same particle concentration distribution when the light guiding directions are made opposite to each other. In this manner, the multiple light scattering layers 110 that form multiple light diffusers 100 may be formed in the same scattering layer formation step by repeating the addition rate variation corresponding to the particle concentration distribution in one light scattering layer 110 while alternately reversing a direction of the variation. In the case of a concentration distribution such that the particle concentration is high near a central portion and decreases toward incident edges, the addition rate variation (e.g., the range including both dashed lines (1) and (2) in FIG. 8B) corresponding to the particle concentration distribution in one light scattering layer 110 may be repeated without reversing a direction of the variation. In both cases, sections having a desired concentration distribution should be cut off. When the addition rate variation corresponding to the particle concentration distribution of one light scattering layer 110 is repeated, a predetermined buffer region (a region for moving from distribution (1) to distribution (2)) may be provided before moving to the subsequent addition rate variation. Then, when the light diffuser 100 is cut off, it should be cut off with the buffer region removed.

Also, although the above example is an example in which a thermoplastic resin is used as a material for the base 111, a thermosetting resin may be used as a material for the base 111. When a thermosetting resin is used as a material for the base 111, a particle dispersion liquid is first prepared by dispersing the light scattering particles 112 in resin before curing (a particle dispersion step). Then, resin before thermal curing that is material for the base 111, and the prepared particle dispersion liquid are poured into a mold while being mixed together (a mixing step). At this time, by varying the ratio of the mixed two materials with time, it is possible to vary the particle concentration along a direction in which the position of pouring to the mold is changed. Then, a resin formed body of desired shape can be prepared by heating the particle-containing resin material contained in the mold.

As above, with this embodiment, it is possible to easily control the brightness or hue in the emission surface of the light diffuser, and easily implement a particle concentration distribution that provides such a brightness or hue in the emission surface. Thus, it is possible to easily manufacture a light diffuser in which the brightness or hue in an emission surface is controlled and a device using it.

Second Embodiment

Figure 9A:
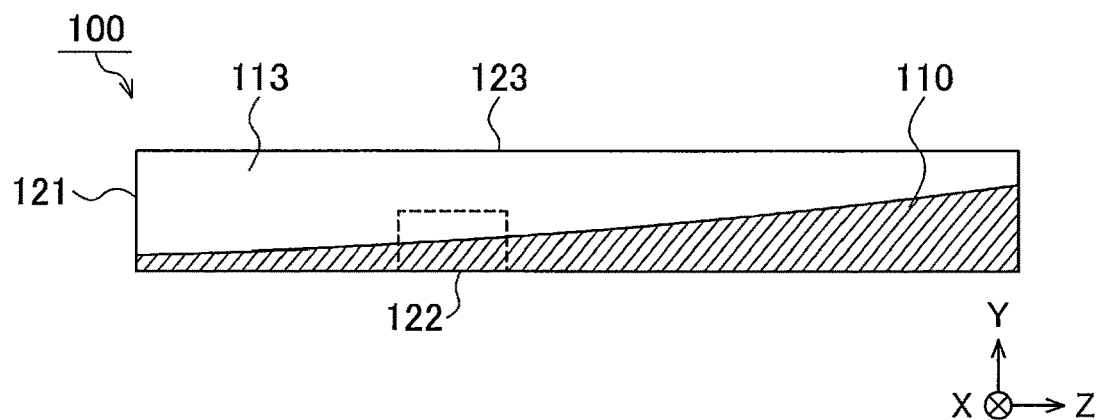
FIGS. 9A and 9B are cross-sectional views illustrating an example of a light diffuser 100 according to a second embodiment.
Figure 9B:
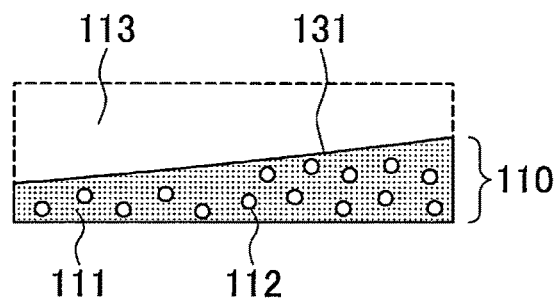

FIG. 9A is a cross-sectional view illustrating an example of a light diffuser 100 according to a second embodiment. Also, FIG. 9B is a main portion enlarged view of a region enclosed by the dashed line of FIG. 9A. The light diffuser 100 illustrated in FIGS. 9A and 9B includes at least one incident surface 121 and at least one emission surface 122, as with the first embodiment. Also, the light diffuser 100 includes a light scattering layer 110. Also, the light diffuser 100 may include a back surface 123.

In the example illustrated in FIGS. 9A and 9B, a main surface on the −Y axis direction side is illustrated as the emission surface 122, and a main surface on the +Y axis direction side is illustrated as the back surface 123. However, for example, it is also possible to take the main surface on the +Y axis direction side in the drawing as the emission surface 122 and the main surface on the −Y axis direction side in the drawing as the back surface 123, or to take the main surfaces on the ±Y axis direction sides as the emission surface 122.

The following mainly describes differences from the first embodiment.

The first embodiment mainly describes an example in which the particle concentration in the light scattering layer 110 varies with distance from the incident edge while the light scattering layer 110 has a substantially uniform thickness, and thereby the particle concentration in the light diffuser 100 has an in-plane distribution as viewed from an emission surface side. On the other hand, this embodiment mainly describes an example in which a thickness of the light scattering layer 110 varies with distance from the incident edge while the particle concentration in the light scattering layer 110 is substantially uniform, and thereby the particle concentration in the light diffuser 100 has an in-plane distribution as viewed from an emission surface side. It is also possible to control the in-plane distribution of the particle concentration in the light diffuser 100 more freely by, for example, combining the first and second embodiments and making the particle concentration in the light scattering layer 110 vary with distance from the incident edge and making a thickness (the length in a normal direction of the emission surface) of the light scattering layer 110 vary with distance from the incident edge.

The light diffuser 100 includes the light scattering layer 110 that is single-layer or multi-layer and has a thickness (the length in the Y axis direction in the drawing) that varies with distance from the incident edge.

For example, the light diffuser 100 may include the light scattering layer 110 having a thickness that increases away from the incident surface 121, as illustrated in FIG. 9A. In this case, the concentration of the light scattering particles 112 in the light scattering layer 110 may be substantially uniform. In this manner, by making the thickness vary with distance from the incident edge while making the particle concentration in the light scattering layer 110 uniform, it is possible to make the particle concentration in the light diffuser 100 have an in-plane distribution. Also in this embodiment, the concentration of the light scattering particles 112 in the light scattering layer 110 may have a distribution as in the first embodiment.

Figure 10A:
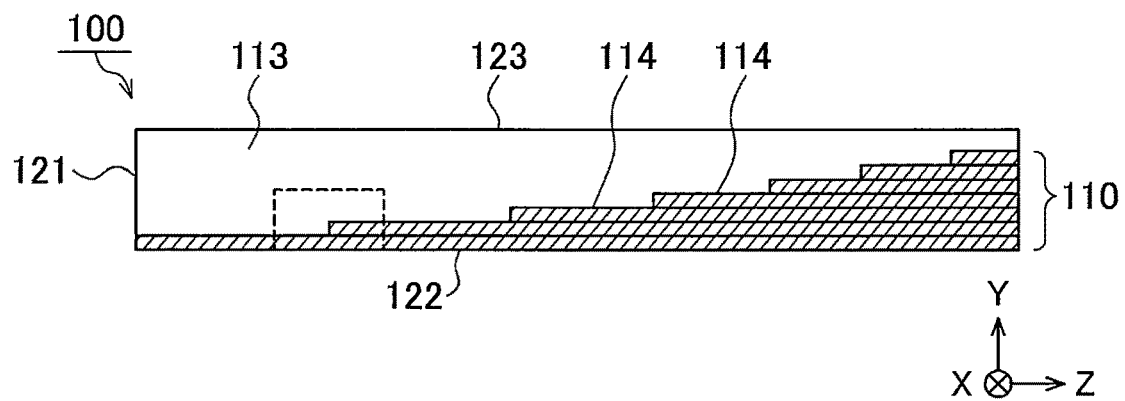
FIGS. 10A and 10B are cross-sectional views illustrating another example of the light diffuser 100 according to the second embodiment.

Also, for example, the light diffuser 100 may include the light scattering layer 110 having a stepped layer structure as illustrated in FIG. 10A. FIG. 10A is a cross-sectional view of another example of the light diffuser 100 according to the second embodiment. Also, FIG. 10B is a main portion enlarged view of a region enclosed by the dashed line of FIG. 10A.

The light scattering layer 110 may include a laminated structure of plate-shaped light scattering layers (referred to below as diffusing films 114) in which the light scattering particles 112 are dispersed in bases 111, for example. Here, the laminated structure of the diffusing films 114 may include two or more layers having different lengths in a light guiding direction of light Lt. Moreover, in the laminated structure of the diffusing films 114, lengths (the lengths in the light guiding direction of light Lt) of the respective layers may be different. That is, the light scattering layer 110 may be a laminate of diffusing films having different lengths, for example. More specifically, the light scattering layer 110 may be a laminate in which multiple diffusing films 114 having different lengths in the light guiding direction of light Lt are laminated in a thickness direction (the Y axis direction in the drawing) of the light diffuser 100. In this manner, by making the number of laminated films constituting the light scattering layer 110 vary with distance from the incident edge while making the particle concentration in the light scattering layer 110 uniform, it is possible to make the particle concentration in the light diffuser 100 have an in-plane distribution. The concentrations of the light scattering particles 112 in the diffusing films 114 of the respective layers may be the same or different. By controlling the particle concentrations of the respective layers, the lengths and arrangement of the respective layers, and the number of laminated layers, it is possible to easily control the particle concentration distribution in the light diffuser 100 depending on the distance x from the incident edge.

The diffusing film 114 of each layer may be joined to the diffusing film 114 of another layer by adhesive, thermal fusion bonding, or the like, for example. In this case, joint surface(s) 131 may be present between the layers. The way in which the joint surface(s) 131 are formed is not particularly limited.

Figure 10B:
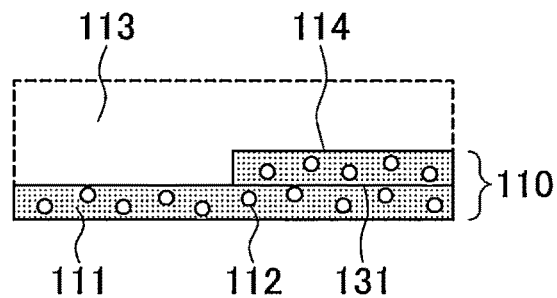

In the example illustrated in FIGS. 10A and 10B, the diffusing films 114 whose lengths gradually decrease in the +Y axis direction are laminated. However, it is also possible to laminate diffusing films 114 whose lengths gradually decrease in the −Y axis direction, or combine them. As such, the manner in which the diffusing films 114 are laminated is not particularly limited, and it is sufficient that the total thickness of the diffusing films 114 vary in a main surface of the light diffuser 100.

Also, the light diffuser 100 of this embodiment further includes a light transmitting layer 113. The light transmitting layer 113 is joined to the light scattering layer 110, and thereby forms part of a light guiding portion that functions as a light guiding path for light Lt. That is, the light scattering layer 110 and light transmitting layer 113 form a structure (the light guiding portion) that functions as the light guiding path for light Lt. The light transmitting layer 113 is disposed also for the purpose of, for example, equalizing the thickness of the light diffuser 100 or flattening a main surface. For example, the light transmitting layer 113 is disposed to fill a space generated when the light scattering layer 110 of stepped shape is disposed in a target shape of the light diffuser 100. It is preferable that the material for the light transmitting layer 113 be the same as that for the base 111 or be substantially the same as that for the base 111 in refractive index in the wavelength range of light Lt after the formation.

In this embodiment, the light scattering layer 110 and light transmitting layer 113 are joined to form a structure (light guiding portion) that functions as a light guiding path for light Lt. Thus, light Lt travels in the +Z axis direction in the light guiding portion formed by the light scattering layer 110 and light transmitting layer 113 while being repeatedly reflected at the surfaces, for example. In this case, the concentration of the light scattering particles 112 in the formed structure (light guiding portion) is made to have a distribution such that the concentration increases non-linearly with distance from the incident edge in the light guiding direction of light Lt.

Also in this embodiment, the light diffuser 100 may include a transparent substrate, and for example, the light scattering layer 110 and light transmitting layer 113 may be sandwiched by two transparent substrates.

Next, a method of manufacturing the light diffuser 100 according to this embodiment will be described. FIGS. 11A to 11D are explanatory diagrams illustrating an example of the method of manufacturing the light diffuser 100 according to this embodiment. The example illustrated in FIGS. 11A to 11D corresponds to the configuration example of FIGS. 9A and 9B.

In this example, a resin material (such as resin pellets) in which the light scattering particles 112 are dispersed in material that is the same as the base 111 of the light scattering layer 110 is prepared (a particle dispersion step). Known methods can be used for this step. As an example, the method illustrated in FIG. 7A may be used.

Figure 11A:
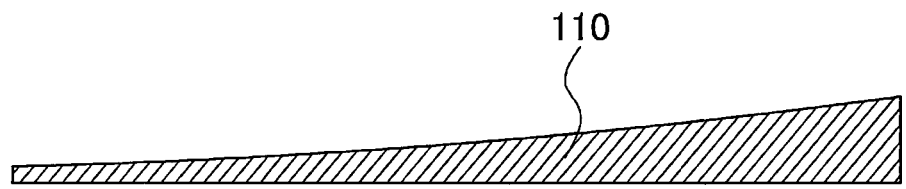
FIGS. 11A to 11D are explanatory diagrams illustrating an example of a method of manufacturing the light diffuser 100 according to the second embodiment.

Then, a resin formed body of irregular shape designed to achieve a target concentration is prepared (FIG. 11A: a scattering layer formation step). A known method called profile extrusion can be used for this step. For example, a resin formed body of desired shape in which the light scattering particles 112 are dispersed at a target concentration in the base 111 is prepared by using a single screw extruder to extrude thermoplastic resin used as a material for the base 111 and the particle-containing material (resin pellets) prepared in the particle dispersion step while melting and mixing them at a predetermined ratio. For example, in drawing the molten resin from the extruder, by drawing the molten resin through a die processed so that it can form a cross-section having a target shape, it is possible to prepare the light scattering layer 110 having an irregular shape (such as a column body having a wedge-shaped cross-section) in which the light scattering particles 112 are dispersed at a target addition concentration in the base 111.

The particle dispersion step is not necessarily required, and for example, the particle dispersion step can be performed simultaneously in the scattering layer formation step. In this case, the light scattering particles 112 may be fed to the extruder instead of the resin material with the light scattering particles dispersed therein. For example, a resin formed body of desired shape in which the light scattering particles 112 are dispersed at the target concentration in the base 111 may be prepared by using a single screw extruder to extrude the light scattering particles 112 and thermoplastic resin used as a material for the base 111 by means of a die while melting and mixing them at a predetermined ratio.

At least one surface of the formed light scattering layer 110 of irregular shape may have an arbitrary curved surface shape or step. For example, the light scattering layer 110 may be formed in an irregular shape having a curved surface shape or step such that the particle concentration in the light diffuser 100 including the light scattering layer 110 (more specifically, a structure (light guiding portion) formed by an integration step to be described later) satisfies the above first to third conditions or satisfies the above formula (1). In the scattering layer formation step, due to the extruded molten resin being rubbed by the die, streaky irregularities may appear on the surface of the light scattering layer 110 after the formation. They may be left, but are preferably scraped off by polishing or the like.

Also, as another example of a method of forming the light scattering layer 110 of irregular shape, multiple light scattering layers 1101 (resin formed bodies) in which the light scattering particles 112 are dispersed at a target concentration in the bases 111 may be joined and integrated. As a method of integrating the multiple light scattering layers 1101, methods that are the same as those in the first embodiment can be used.

Figure 11B:
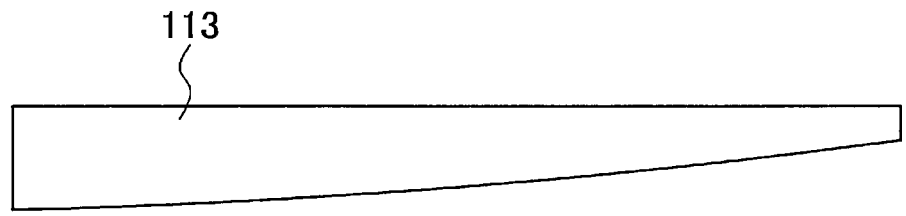
Figure 11C:
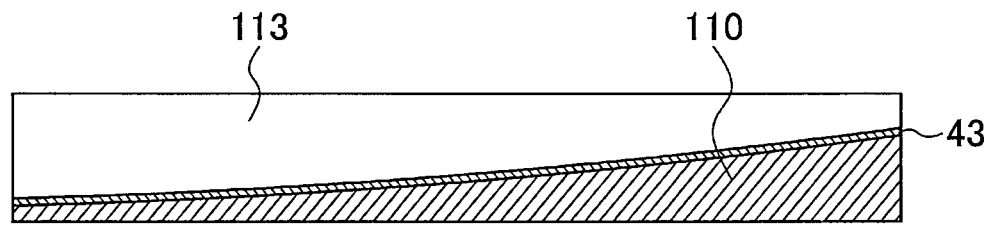

Then, the light transmitting layer 113 to be joined to the light scattering layer 110 of irregular shape is prepared (FIG. 11B: a transmitting layer formation step). A known method called profile extrusion can be used for this step. For example, the light transmitting layer 113 as a resin formed body of desired shape can be prepared by using a single screw extruder to melt thermoplastic resin used as a material for the light transmitting layer 113 and when the molten resin is extruded, draw it through a die processed so that it can form a cross-section having a target shape.

Figure 11D:
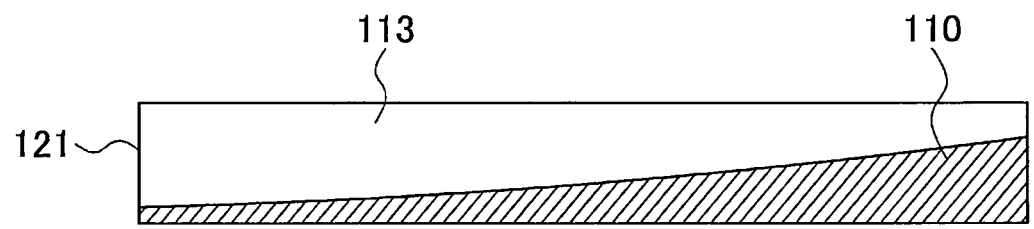

Then, the prepared light scattering layer 110 of irregular shape and the light transmitting layer 113 are joined, and thereby the light scattering layer 110 and light transmitting layer 113 are integrated (FIG. 11D: the integration step). Known methods can be used for this step. For example, the light scattering layer 110 and light transmitting layer 113 may be joined and integrated by adhesive, thermal fusion bonding, or the like.

The transmitting layer formation step and integration step can be performed simultaneously. In this case, it is possible to omit the transmitting layer formation step, and in the integration step, form a structure with the light scattering layer 110 and light transmitting layer 113 integrated while combining the prepared light scattering layer 110 of irregular shape and material for the light transmitting layer 113. In this step, injection molding may be used, for example. Specifically, it is possible to insert the light scattering layer 110 of irregular shape prepared in the scattering layer formation step into a mold, and fill the mold with thermoplastic resin used as a material for the light transmitting layer 113 to integrate them. Also, when the laminated films are long and continuous production is possible, extrusion may be used. Specifically, it is possible to integrate the light scattering layer 110 of irregular shape and thermoplastic resin used as a material for the light transmitting layer 113 while combining them. As the method of integrating the light scattering layer 110 and light transmitting layer 113, the above methods are preferable, but methods other than these can be used. In the integration step, when the light scattering layer 110 and light transmitting layer 113 are joined together in the structure after the formation and a structure (also referred to as a light guiding portion) that functions as a light guiding path for light Lt is formed by the light scattering layer 110 and light transmitting layer 113 joined together, regardless of the used specific method, it is said that the light scattering layer 110 and light transmitting layer 113 are joined together. Thus, "join" in this step includes not only an aspect in which two structures are joined together simply, but also filling in insert molding and combining in extrusion as described above.

Also, FIGS. 12A to 12D are explanatory diagrams illustrating another example of the method of manufacturing the light diffuser 100 according to this embodiment. The example illustrated in FIGS. 12A to 12D corresponds to the configuration example of FIGS. 10A and 10B.

Figure 12A:
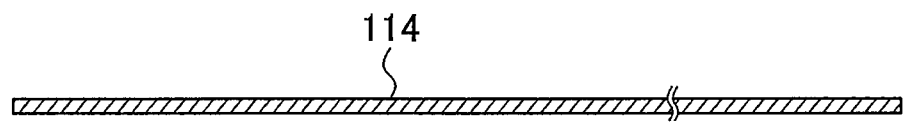
FIGS. 12A to 12D are explanatory diagrams illustrating another example of the method of manufacturing the light diffuser 100 according to the second embodiment.

In this example, diffusing films 114 designed to achieve a target concentration are first prepared (FIG. 12A: a scattering layer formation step). Known methods can be used for this step. As an example, the method illustrated in FIGS. 8A and 8B may be used. In this case, each diffusing film 114 prepared may be prepared as a light scattering layer 110 of single layer having a substantially uniform concentration. While the thickness of each film is typically not greater than 1 mm, it is preferably in the range of 10 to 150 μm since the distribution of the particle concentration can be controlled more finely. The resin formed bodies prepared in the above scattering layer formation step are also referred to as pre-light scattering portions.

Figure 12B:
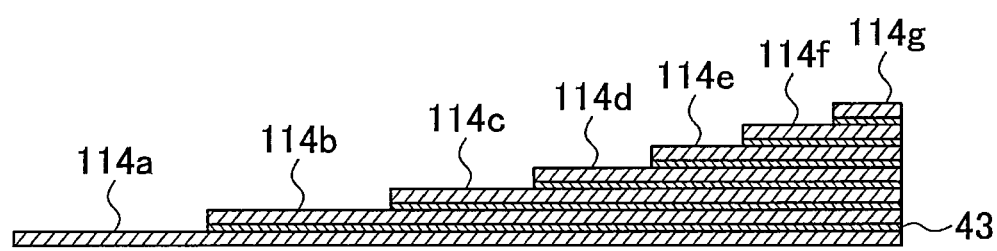
Figure 12C:
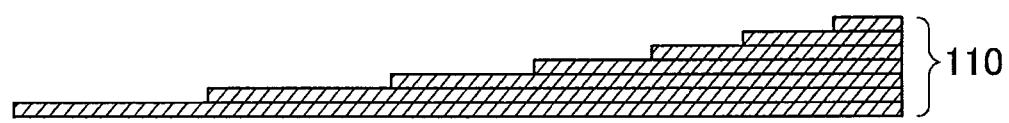

Then, the prepared diffusing films 114 are laminated with the diffusing films 114 having different lengths (FIG. 12B: a scattering layer lamination step). For example, the multiple diffusing films 114 may be laminated (joined in the thickness direction) in a stepped manner with the diffusing films 114 having different lengths such that the number of layers increases away from the incident edge. Thereby, a light scattering layer 110 (laminated film structure) of irregular shape whose thickness varies in a surface is formed (see FIG. 12C). In this case, the diffusing films may be laminated so that the particle concentration in the light diffuser 100 (more specifically, a structure (light guiding portion) formed by an integration step to be described later) having the laminated film structure after the formation satisfies the above first to third conditions or satisfies the above formula (1). Although the way of joining the layers in the laminated structure is not particularly limited, for example, the diffusing film 114 of each layer may be joined to the diffusing film 114 of another layer by adhesive, thermal fusion bonding, or the like. Thereby, the light scattering layer 110 (laminated film structure) of irregular shape whose thickness varies in a surface is formed (see FIG. 12C). As the adhesive, a solvent adhesive may be used as with the other embodiment.

Figure 12D:
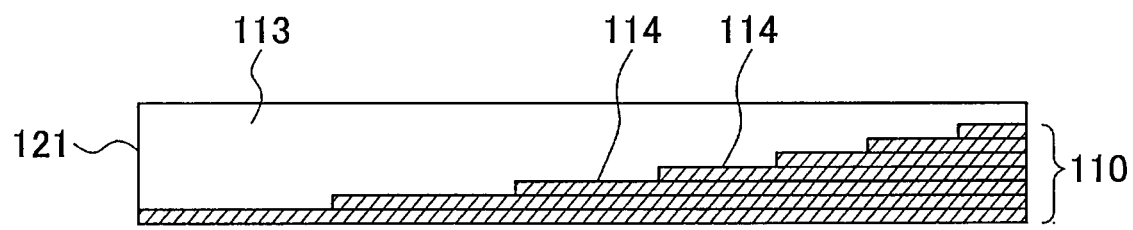

Then, the light scattering layer 110 (laminated film structure) of irregular shape and the light transmitting layer 113 are joined, and thereby the light scattering layer 110 and light transmitting layer 113 are integrated (FIG. 12D: the integration step). Known methods can be used for this step. For example, injection molding may be used. Specifically, it is possible to insert the laminated film structure prepared in the scattering layer formation step into a mold, and fill the mold with thermoplastic resin used as a material for the light transmitting layer 113 to integrate them. Also, when the laminated film structure is long and continuous production is possible, extrusion may be used. Specifically, it is possible to integrate the laminated film structure and thermoplastic resin used as a material for the light transmitting layer 113 while combining them. As the method of integrating the laminated film structure and light transmitting layer 113, the above methods are preferable, but methods other than these can be used. Also in this step, when the light scattering layer 110 and light transmitting layer 113 are joined together in the structure after the formation and a structure (also referred to as a light guiding portion) that functions as a light guiding path for light Lt is formed by the light scattering layer 110 and light transmitting layer 113 joined together, regardless of the used specific method, it is said that the light scattering layer 110 and light transmitting layer 113 are joined together. Thus, "join" in this step includes not only an aspect in which two structures are joined together simply, but also filling in insert molding and combining in extrusion as described above.

Thus, it is possible to form the light diffuser 100 in which the structure (light guiding portion) that functions as the light guiding path for light Lt is formed by the light scattering layer 110 of irregular shape and the light transmitting layer 113. Also in this example, when the light diffuser 100 includes a functional layer in addition to the light guiding portion, the other functional layer may be laminated to the structure formed by the integration step of FIG. 12D, for example.

Also, depending on the formation method, in the integrated structure (light guiding portion), there may be no clear boundary, such as the joint surface 131, between the light transmitting layer 113 and the light scattering layer 110. Also in this case, by causing light to be incident on the light diffuser 100 including the structure after the formation in multiple directions, such as the light guiding direction of light Lt and a direction perpendicular thereto, and measuring the variation in light intensity of scattered light generated thereby, it is possible to estimate to some extent a boundary between the light scattering layer 110 and the light transmitting layer 113 or the particle concentration distribution in the light diffuser 100.

As above, with this embodiment, it is possible to easily control the brightness or hue in the emission surface of the light diffuser, and easily implement a particle concentration distribution that provides such a brightness or hue in the emission surface, as with the first embodiment. Thus, it is possible to easily manufacture a light diffuser in which the brightness or hue in an emission surface is controlled and a device using it.

Figure 13A:
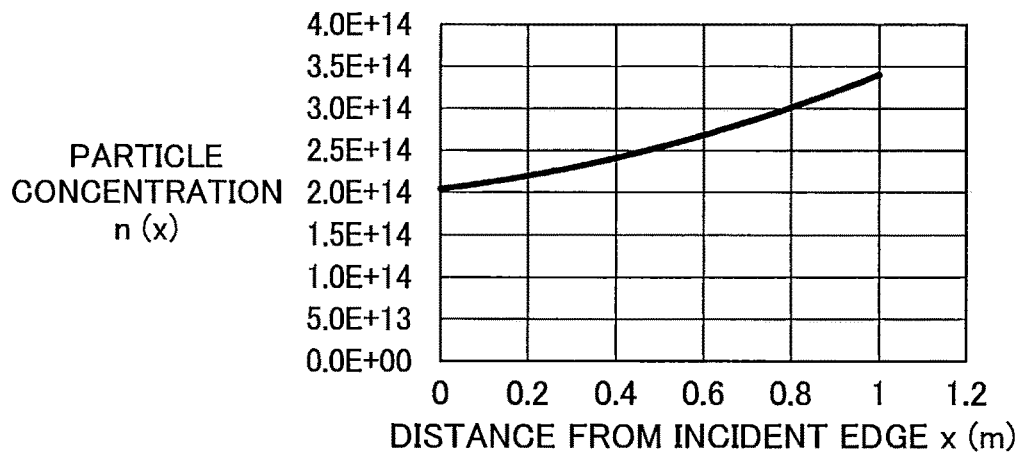
FIGS. 13A to 13C are graphs illustrating an example of the variation in concentration of light scattering particles in a diffuser 100, the variation in intensity of forward light, and the variation in intensity of scattered light with respect to a distance x.
Figure 13B:
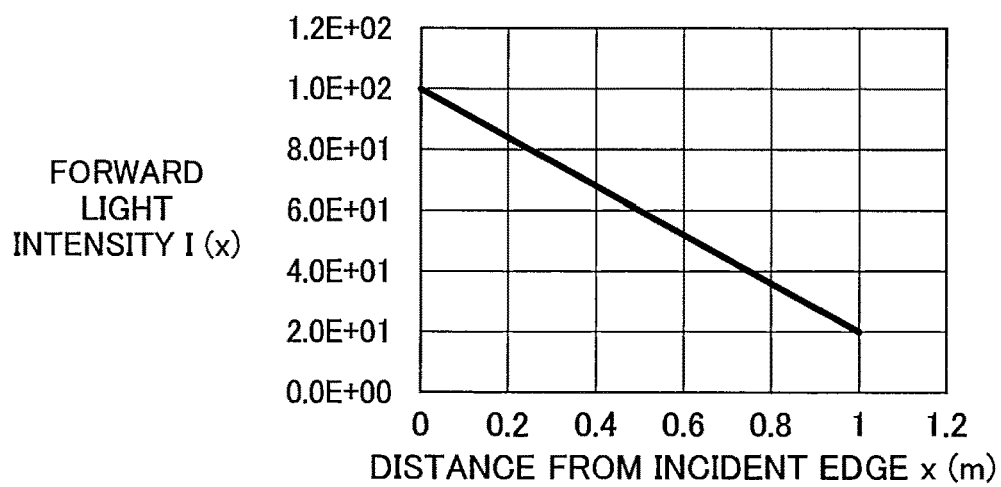
Figure 13C:
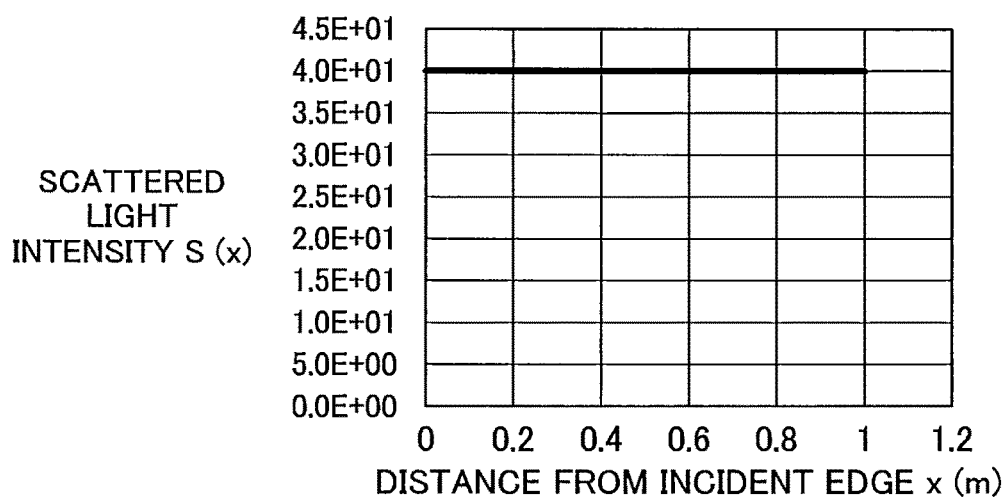

FIGS. 13A to 13C are graphs illustrating an example of the variation in the concentration (n(x)) of the light scattering particles in the diffuser 100, the variation in the intensity (I(x)) of forward light, and the variation in the intensity (S(x)) of scattered light with respect to the distance x in a case where the light scattering particles 112 are dispersed in the light scattering layer 110 so that the particle concentration distribution in the diffuser 100 as viewed from an emission surface side satisfies formula (1). With the above model, for example, when the particle concentration in the diffuser 100 with respect to the distance x satisfies formula (1) as illustrated in FIG. 13A, the intensity of scattered light with respect to the distance x can be equalized as illustrated in FIG. 13C.

Figure 14A:
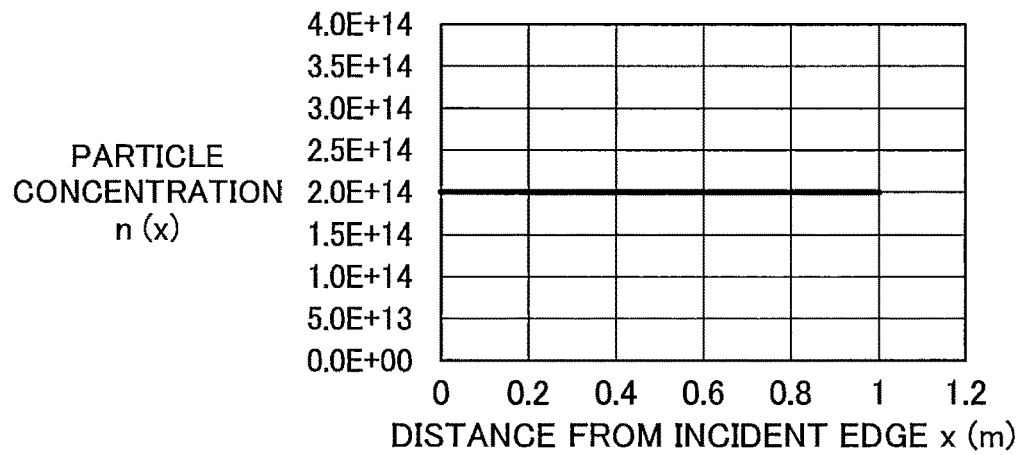
FIGS. 14A to 14C are graphs illustrating an example of the variation in concentration of light scattering particles in a diffuser 100, the variation in intensity of forward light, and the variation in intensity of scattered light with respect to a distance x.
Figure 14B:
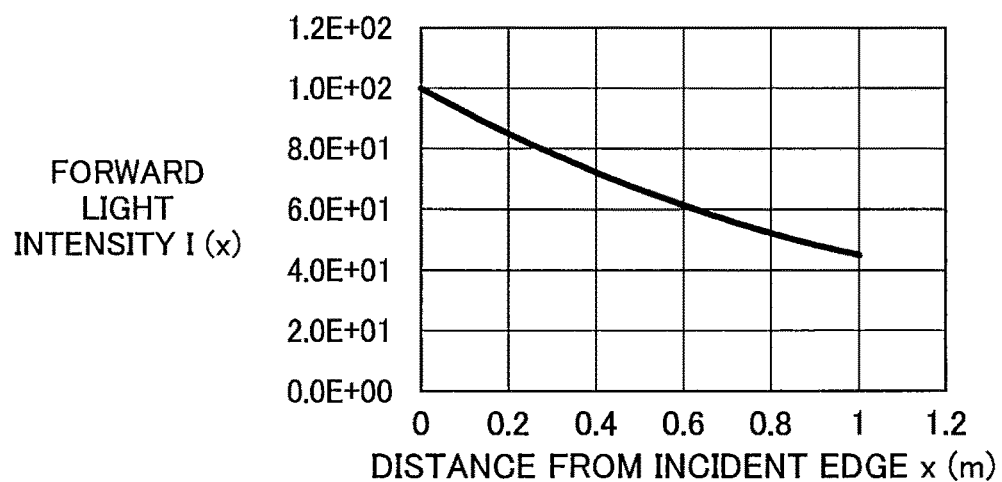
Figure 14C:
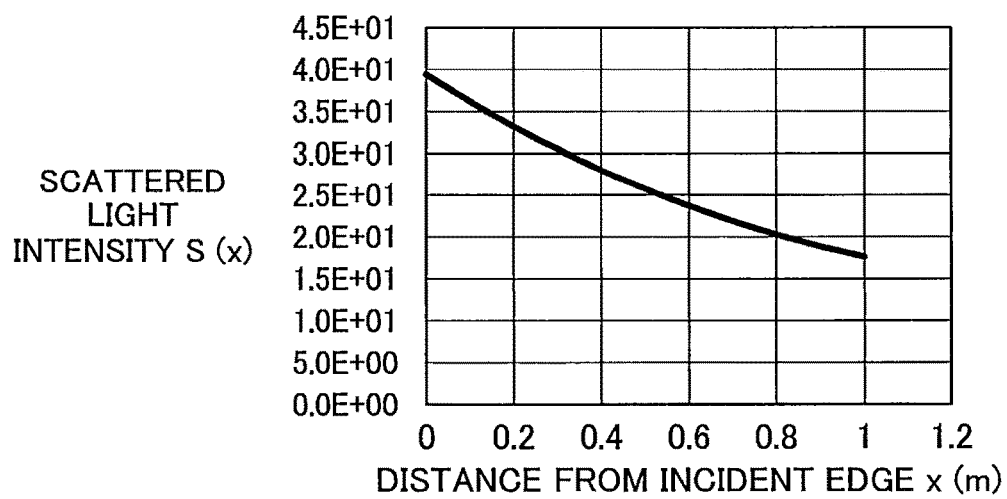

Also, FIGS. 14A to 14C are graphs illustrating an example of the variation in the concentration (n(x)) of the light scattering particles in the diffuser 100, the variation in the intensity (I(x)) of forward light, and the variation in the intensity (S(x)) of scattered light with respect to the distance x in a case where the particle concentration in the diffuser 100 as viewed from an emission surface side is uniform. With the above model, for example, when the particle concentration in the diffuser 100 is uniform with respect to the distance x as illustrated in FIG. 14A, it can be seen that the intensity of scattered light decreases with the distance x as illustrated in FIG. 14C.

Although the above description describes an example in which the light diffuser 100 is used in the lighting device 200, the above light diffuser 100 is also applicable to objects other than lighting devices. For example, the above light diffuser 100 is also applicable to display panels or backlights of display devices, building products, such as partitions and windows, and the like. The application of the light diffuser 100 is not limited to them.

REFERENCE SIGNS LIST 200 lighting device
10 light source
11 substrate
12 light emitting element
13 light emitting surface
100 light diffuser
110, 1101, 1101a, 1101b, 1101c, 1101d light scattering layer
111 base (medium)
112 light scattering particle
113 light transmitting layer
114 light diffusing film 121 incident surface
122, 122a, 122b emission surface
123 back surface
131 joint surface
101a, 101b main surface
102a, 102b, 102c, 102d side surface
41 material
42 particle-containing material (resin pellet)
43 adhesive
51A resin material feeder
51B gravimetric powder feeder
52A, 52B hopper
53 extruder (single screw extruder)
54 T-die
55 drawing roll
56a, 56b cutter

The invention claimed is:

1. A light diffuser to receive first light and emit scattered light, the light diffuser comprising:
an incident surface to receive the first light;
a first light scattering portion including light scattering particles present in a medium, the first light scattering portion generating the scattered light by guiding the received first light and scattering the received first light with the light scattering particles; and
an emission surface to emit the scattered light,
wherein a concentration of the light scattering particles in the light diffuser is distributed such that the concentration increases non-linearly and discontinuously with distance from an incident edge in a light guiding direction of the first light,
wherein the light scattering particles are distributed to increase exponentially with the distance, and
wherein the light scattering particles are distributed to increase according to a fractional function.

2. The light diffuser of claim 1, wherein
the light diffuser receives the first light and emits the scattered light that simulates a blue sky,
the light scattering particles are nanoparticles, and
the scattered light has a correlated color temperature higher than a correlated color temperature of the first light.

3. The light diffuser of claim 1, wherein when a distance from the incident edge in the light guiding direction of the first light is denoted by (x) and a concentration distribution represented by the concentration with respect to the distance (x) is denoted by (n(x)), the concentration distribution (n(x)) satisfies the fractional function represented by using a ratio $(S_0 I_0)$ of a scattered light intensity $(S_0)$ and an incident light intensity $(I_0)$ at the incident edge of the first light, a cross-sectional area (q) of the light scattering particles, and a scattering probability (p) of the light scattering particles.

4. The light diffuser of claim 1, wherein
the light diffuser receives the first light and emits the scattered light that simulates a blue sky,
the light scattering particles are nanoparticles, and
the first light scattering portion generates the scattered light by using Rayleigh scattering due to the light scattering particles.

5. The light diffuser of claim 1, wherein
the light diffuser comprises a plurality of the incident surfaces to receive the first light, and
the concentration is distributed such that the concentration increases non-linearly and continuously or discontinuously with distances from all incident edges in all light guiding directions of the first light.

6. The light diffuser of claim 1, wherein the first light scattering portion comprises a plurality of second light scattering portions that are arranged along the light guiding direction of the first light, each include light scattering particles present in a medium, and have different concentrations of the light scattering particles in the media.

7. The light diffuser of claim 1, further comprising a light transmitting portion that does not include the light scattering particles in a medium,
wherein a light guiding portion to function as a light guiding path for the first light is formed by the first light scattering portion and the light transmitting portion joined to the first light scattering portion.

8. The light diffuser of claim 7, wherein the first light scattering portion is a laminated structure of two or more diffusing films in which the light scattering particles are dispersed and that have different lengths in the light guiding direction of the first light, the diffusing films having plate shapes, the lengths being lengths of the plate shapes.

9. The light diffuser of claim 8, wherein in the laminated structure, the diffusing films are laminated in a direction perpendicular to the light guiding direction of the first light, thereby forming a stepped layer structure.

10. The light diffuser of claim 8, wherein for each of the diffusing films forming respective layers of the laminated structure, a concentration of the light scattering particles in the diffusing film is substantially uniform.

11. The light diffuser of claim 7, wherein the first light scattering portion is a structure in which the concentration of the light scattering particles in the medium is substantially uniform and that has a predetermined curved surface shape or step.

12. The light diffuser of claim 1, wherein the light diffuser is plate-shaped or rod-shaped.

13. The light diffuser of claim 8, wherein the first light travels toward an edge surface opposite to the incident surface in the light guiding portion formed by the laminated structure as the first light scattering portion and the light transmitting portion while being repeatedly reflected at a surface of the light guiding portion.

14. A lighting device comprising:
a light source to emit the first light; and
the light diffuser of claim 1.

15. A method of manufacturing a light diffuser including an incident surface to receive first light, a light scattering portion that includes light scattering particles present in a medium and generates scattered light by guiding the received first light and scattering the received first light with the light scattering particles, and an emission surface to emit the scattered light, the method comprising:
dispersing the light scattering particles in material for the medium to form a plurality of pre-light scattering portions of predetermined shape that each include light scattering particles in a medium and are different in at least one of concentration of the light scattering particles in the medium and length in a light guiding direction of the first light, wherein a concentration of the light scattering particles is discontinuous with distance from an incident edge in a light guiding direction of the first light; and
joining the plurality of pre-light scattering portions to form the light scattering portion,
wherein the light scattering particles are distributed to increase exponentially with the distance, and
wherein the light scattering particles are distributed to increase according to a fractional function.

16. The method of manufacturing the light diffuser of claim 15, wherein the plurality of pre-light scattering portions are arranged and joined such that a concentration of the light scattering particles in the light scattering portion after the formation increases non-linearly with distance from the incident edge in the light guiding direction of the first light.

17. The method of manufacturing the light diffuser of claim 15, wherein
- the plurality of pre-light scattering portions are plate-shaped and different in length,
- in each pre-light scattering portion, a concentration of the light scattering particles in the medium is substantially uniform,
- the light scattering portion is formed to have a laminated structure by joining the plurality of pre-light scattering portions in a thickness direction, and
- the method further comprising forming a structure of predetermined shape to function as a light guiding path for the first light by joining the light scattering portion formed in the second step and a light transmitting portion that does not include the light scattering particles in a medium.

* * * * *